(12) United States Patent
Rutland et al.

(10) Patent No.: US 10,896,512 B1
(45) Date of Patent: Jan. 19, 2021

(54) DETERMINING AND CONTROLLING PROPELLER SPEEDS USING IMAGING DEVICES

(71) Applicant: Amazon Technologies, Inc., Seattle, WA (US)

(72) Inventors: Joseph Rutland, Norfolk (GB); Demian Shaft Raven, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 16/114,876

(22) Filed: Aug. 28, 2018

(51) Int. Cl.
| | | |
|---|---|---|
| F01D 1/00 | (2006.01) | |
| G05D 1/00 | (2006.01) | |
| B64D 47/08 | (2006.01) | |
| G10K 11/178 | (2006.01) | |
| B64F 5/60 | (2017.01) | |
| G06T 7/246 | (2017.01) | |
| B64D 31/06 | (2006.01) | |
| B64C 39/02 | (2006.01) | |
| G08G 5/00 | (2006.01) | |
| G06T 7/73 | (2017.01) | |

(52) U.S. Cl.
CPC ............ *G06T 7/248* (2017.01); *B64C 39/024* (2013.01); *B64D 31/06* (2013.01); *G06T 7/74* (2017.01); *G08G 5/0069* (2013.01); *G08G 5/0078* (2013.01); *B64C 2201/024* (2013.01); *B64C 2201/042* (2013.01); *B64C 2201/127* (2013.01); *G06T 2207/20084* (2013.01); *G06T 2207/30252* (2013.01)

(58) Field of Classification Search
CPC ......... G06T 7/248; B64F 5/60; G10K 11/178; B64D 47/08; G05D 1/00; F01D 21/00; F01D 1/00; Y02T 70/122
See application file for complete search history.

(56) References Cited

U.S. PATENT DOCUMENTS

| | | | |
|---|---|---|---|
| 2005/0129498 A1* | 6/2005 | Brooks | F01D 21/04 415/1 |
| 2016/0153775 A1 | 6/2016 | Hocquette | |
| 2016/0333730 A1* | 11/2016 | Duke | F01D 21/003 |
| 2018/0040316 A1* | 2/2018 | Beckman | G10K 11/17853 |
| 2018/0273208 A1* | 9/2018 | Ismail | B64F 5/60 |
| 2019/0079511 A1* | 3/2019 | Kessler | G05D 1/0055 |
| 2019/0256224 A1* | 8/2019 | Ho | B64C 39/024 |

FOREIGN PATENT DOCUMENTS

JP 2013226905 A * 11/2013 ........... Y02T 70/122

* cited by examiner

*Primary Examiner* — Yuri Kan
(74) *Attorney, Agent, or Firm* — Athorus, PLLC

(57) ABSTRACT

An aerial vehicle outfitted with one or more cameras captures a sequence of images of a rotating propeller. The images are processed according to one or more techniques to recognize a position of the propeller, or an angle of orientation of the propeller, in each of the images. The positions or angles of the rotating propeller are used to calculate a rotational speed of the propeller, or a direction of rotation of the propeller. The cameras used to capture the images are also available for use in other applications such as navigation, monitoring or collision avoidance. The propeller may include one or more stripes, colors, characters, symbols or other markings to enhance its visibility and facilitate the determination of positions or angles of the propeller within images.

20 Claims, 25 Drawing Sheets

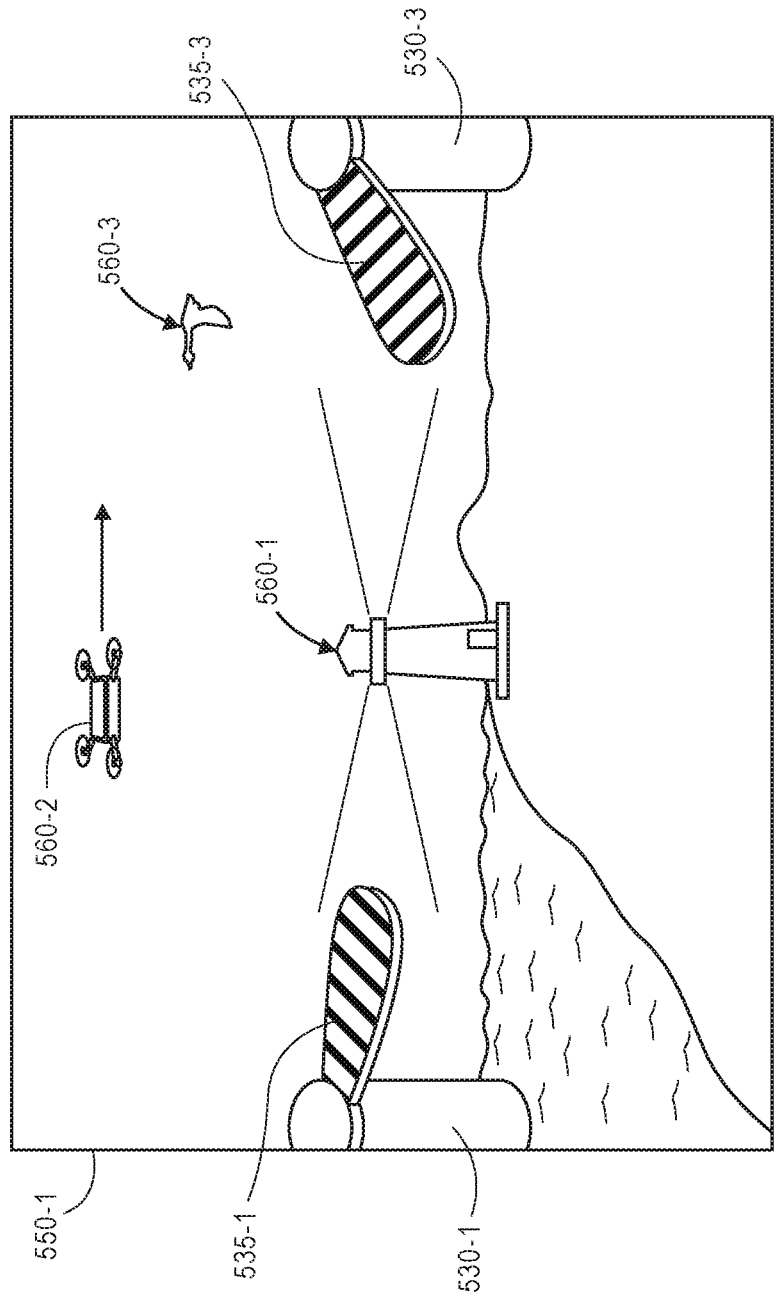

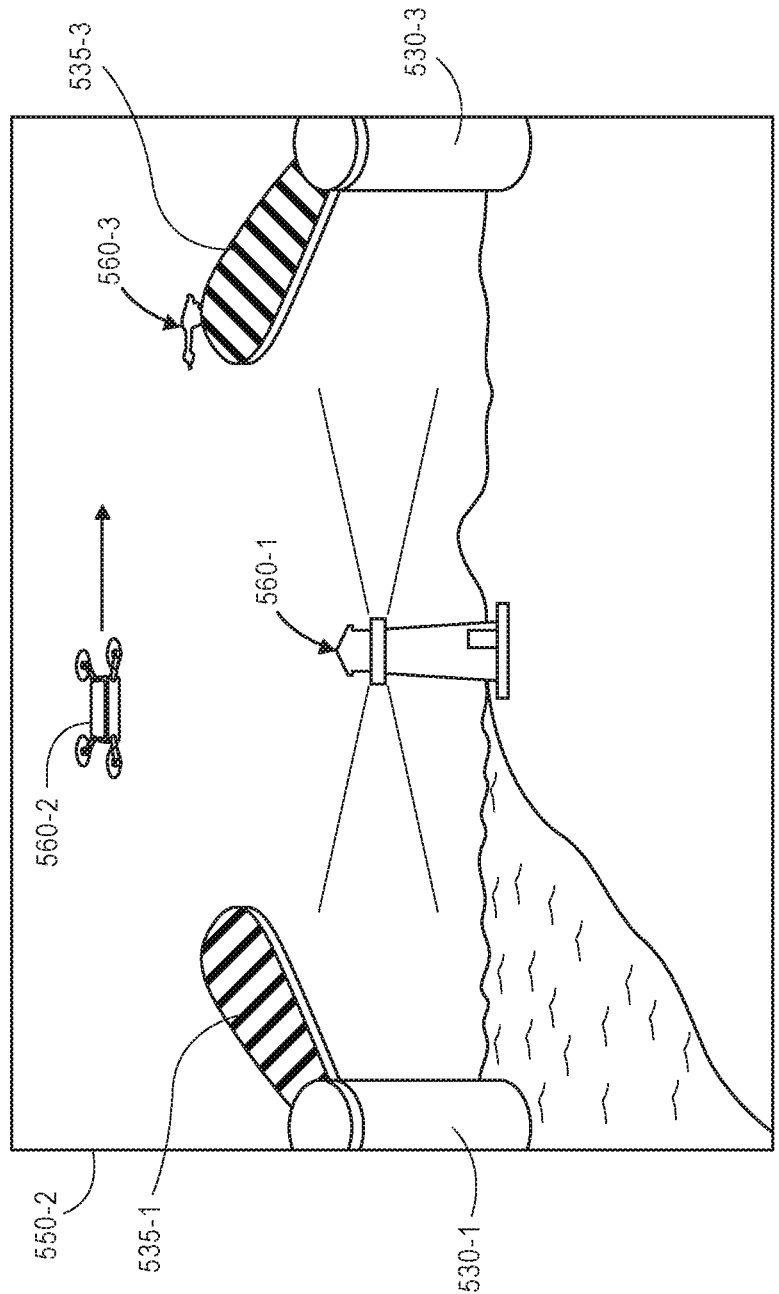

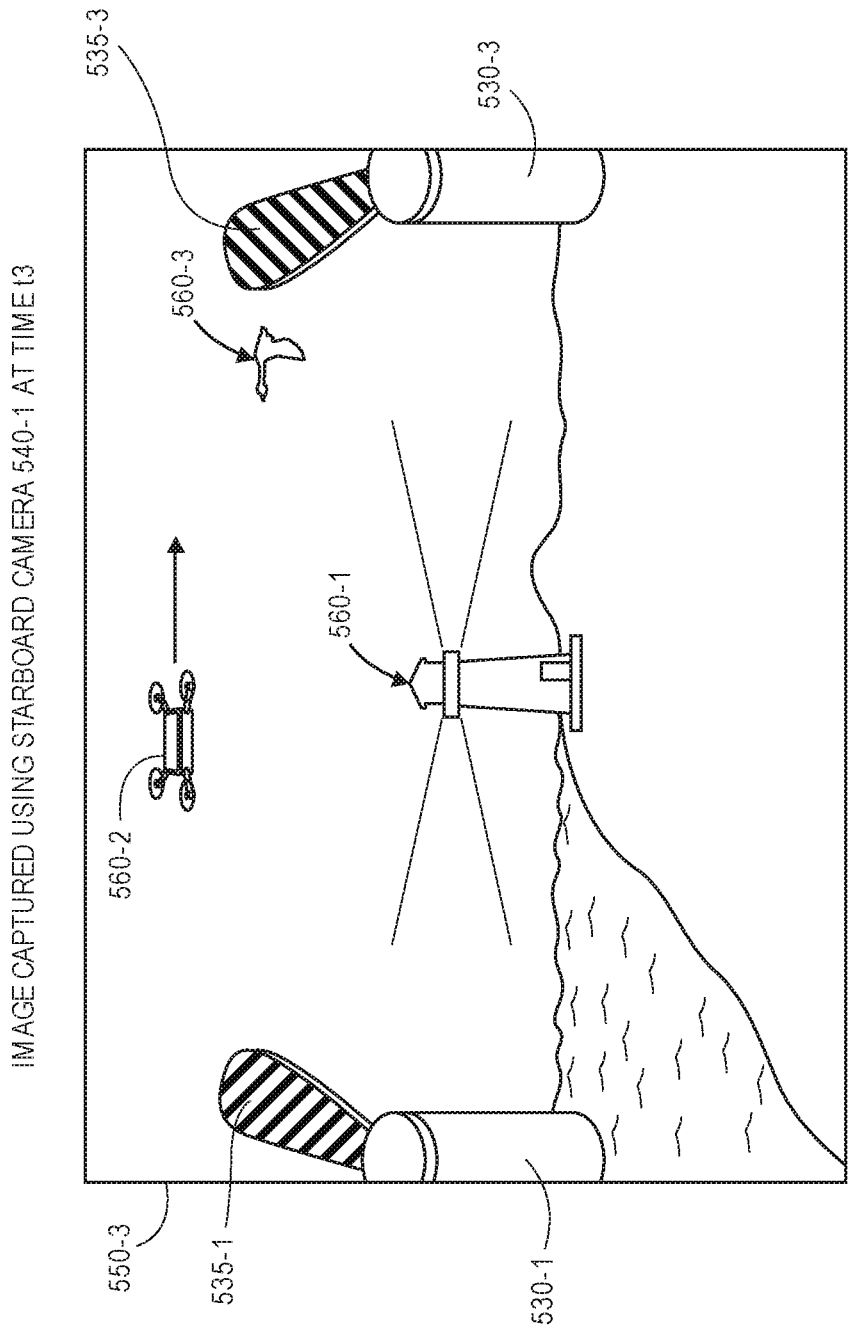

DETERMINING AND CONTROLLING PROPELLER SPEEDS USING IMAGING DEVICES

BACKGROUND

When operating rotating machinery, determining a speed or a position of one or more rotating components is important. In some applications, speeds or positions of rotating components may be determined through the use of a rotary encoder (or a shaft encoder). A rotary encoder is a device that is coupled to a shaft, and used to convert. Encoders are typically mounted to shafts or other components, and electrical signals received from encoders are processed to determine angular positions of such shafts or other components, or rotational displacements of such shafts or other components. Although many rotary encoders are reliable and accurate, a typical rotary encoder may be subject to interference (e.g., magnetic, radio or light interference) or contamination, and are relatively expensive.

In some applications, speeds or positions of rotating components may be determined in a "sensorless" manner. For example, a speed or position of a rotating component (e.g., a shaft of a brushed or brushless direct current motor) may be determined based on voltage levels or current levels supplied to a sensorless controller.

Aerial vehicles are frequently equipped with one or more imaging devices such as digital cameras which may be used to aid in the guided or autonomous operation of an aerial vehicle, to determine when the aerial vehicle has arrived at or passed over a given location, or is within range of one or more structures, features, objects or humans (or other animals), to conduct surveillance or monitoring operations, or for any other purpose. Aerial vehicles may be outfitted with imaging devices in any manner, e.g., by embedding or mounting imaging devices to one or more external surfaces of frames, motors, propellers, control surfaces, appurtenances or extensions, or other features. Such imaging devices may have fields of view that are extended above, forward of, or laterally to directions of travel of the aerial vehicles.

BRIEF DESCRIPTION OF THE DRAWINGS

FIG. 5A through 5H are views of aspects of one system for determining or controlling propeller speeds using imaging devices in accordance with embodiments of the present disclosure.

FIGS. 7A through 7F are views of propellers in accordance with embodiments of the present disclosure.

DETAILED DESCRIPTION

As is set forth in greater detail below, the present disclosure is directed to determining or controlling propeller speeds using imaging devices. More specifically, the systems and methods disclosed herein are directed to capturing a sequence of images regarding operating propellers, and processing the images to recognize the propellers and one or more of their blades depicted therein. In some embodiments, the images may be filtered or otherwise processed to determine positions and angles of the blades within the respective images. Differences between the positions and angles of the propellers as depicted within the frames, and times at which the frames were captured, may be used to determine rotational speeds and directions about which the propellers are rotating, and positions of the respective blades, and information regarding such speeds, directions or positions may be used in support of one or more control functions aboard the aerial vehicle. For example, positions, angles, rotational speeds and directions of the propellers as determined based on imaging devices, or based on electrical inputs to motors rotating the propellers (viz., by sensorless control), may be calculated and selectively utilized according to a weighted function for controlling the operation of the motors.

In some embodiments, a sequence of images may be captured using imaging devices that are provided for one or more other applications, purposes or functions, such as navigation, monitoring or collision avoidance. For example, based at least in part on one or more of the images, an aerial vehicle may not only determine a position, an angle, a rotational speed and/or direction of one or more propellers but also select a course, a speed or an altitude for the safe operation of the aerial vehicle. Additionally, in some embodiments, one or more blades of a propeller may be supplied with one or more markings, e.g., fiducial markings, to aid in the detection and identification of a blade within an image, or in the determination of an angle or position of the blade. One or more embodiments of the present disclosure may be used as a primary technique for determining speeds, directions of rotation or positions of one or more blades of a propeller, or as a secondary technique (e.g., as a backup to or in support of one or more other techniques, such as encoder-based sensorless techniques). One or more of the embodiments of the present disclosure are particularly useful when a propeller is rotating at comparatively slow speeds, or when reversing a direction of rotation of the propeller is desired.

Figure 1A:
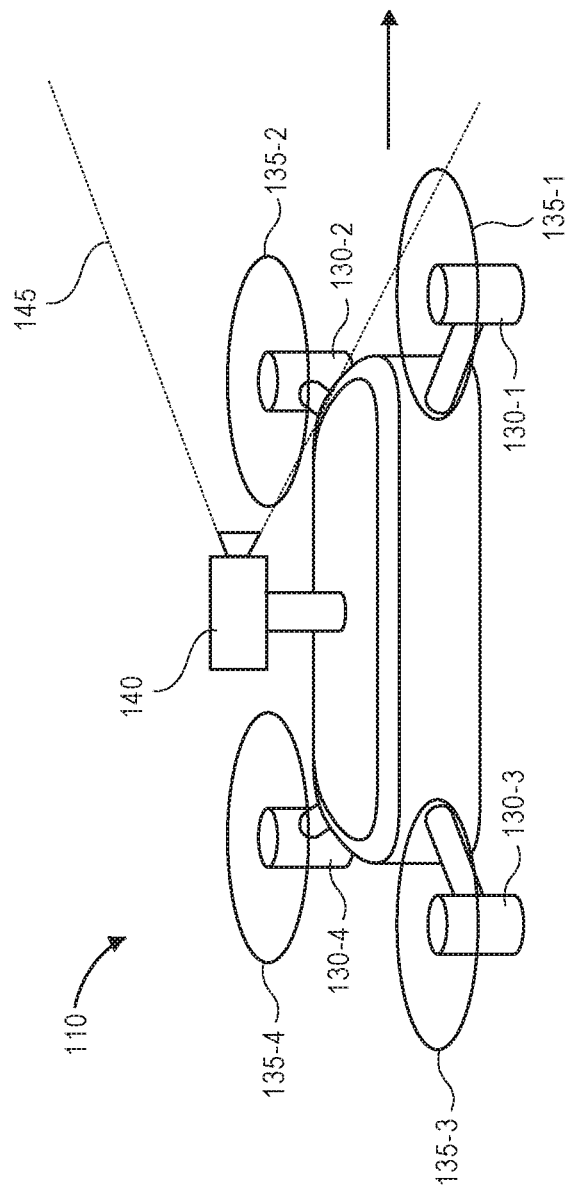
FIGS. 1A through 1F are views of aspects of one system for determining or controlling propeller speeds using imaging devices in accordance with embodiments of the present disclosure.

Referring to FIGS. 1A through 1F, views of aspects of one system for determining or controlling propeller speeds using imaging devices in accordance with embodiments of the present disclosure are shown. Referring to FIG. 1A, an aerial vehicle 110 having a plurality of propulsion motors 130-1, 130-2, 130-3, 130-4 and an imaging device 140. Each of the propulsion motors 130-1, 130-2, 130-3, 130-4 may be configured to rotate a propeller 135-1, 135-2, 135-3, 135-4 within a range of speeds, and in either direction (e.g., clockwise or counterclockwise).

The aerial vehicle 110 is shown as engaged in forward flight operations, and a field of view 145 of the imaging device 140 is aligned in a direction of travel of the aerial vehicle 110. Alternatively, the aerial vehicle 110 may be engaged in either forward flight, vertical flight or hovering operations, and may include any number of additional imaging devices (not shown), which may have fields of view aligned in any direction with respect to directions of travel of the aerial vehicle 110.

Figure 1B:
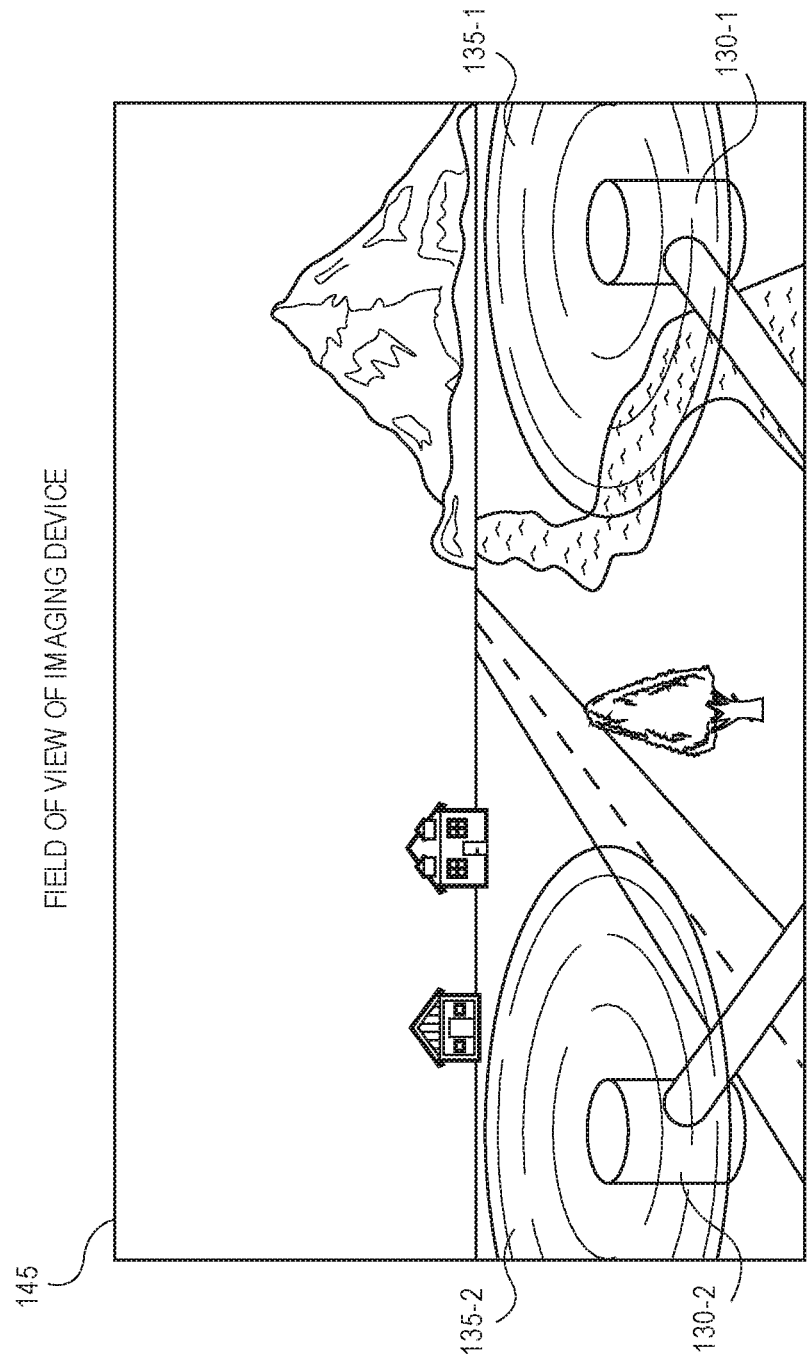

Referring to FIG. 1B, the field of view 145 of the imaging device 140 includes ground-based and airborne features, as well as portions of the propulsion motors 130-1, 130-2 and their respective rotating propellers 135-1, 135-2.

Figure 1C:
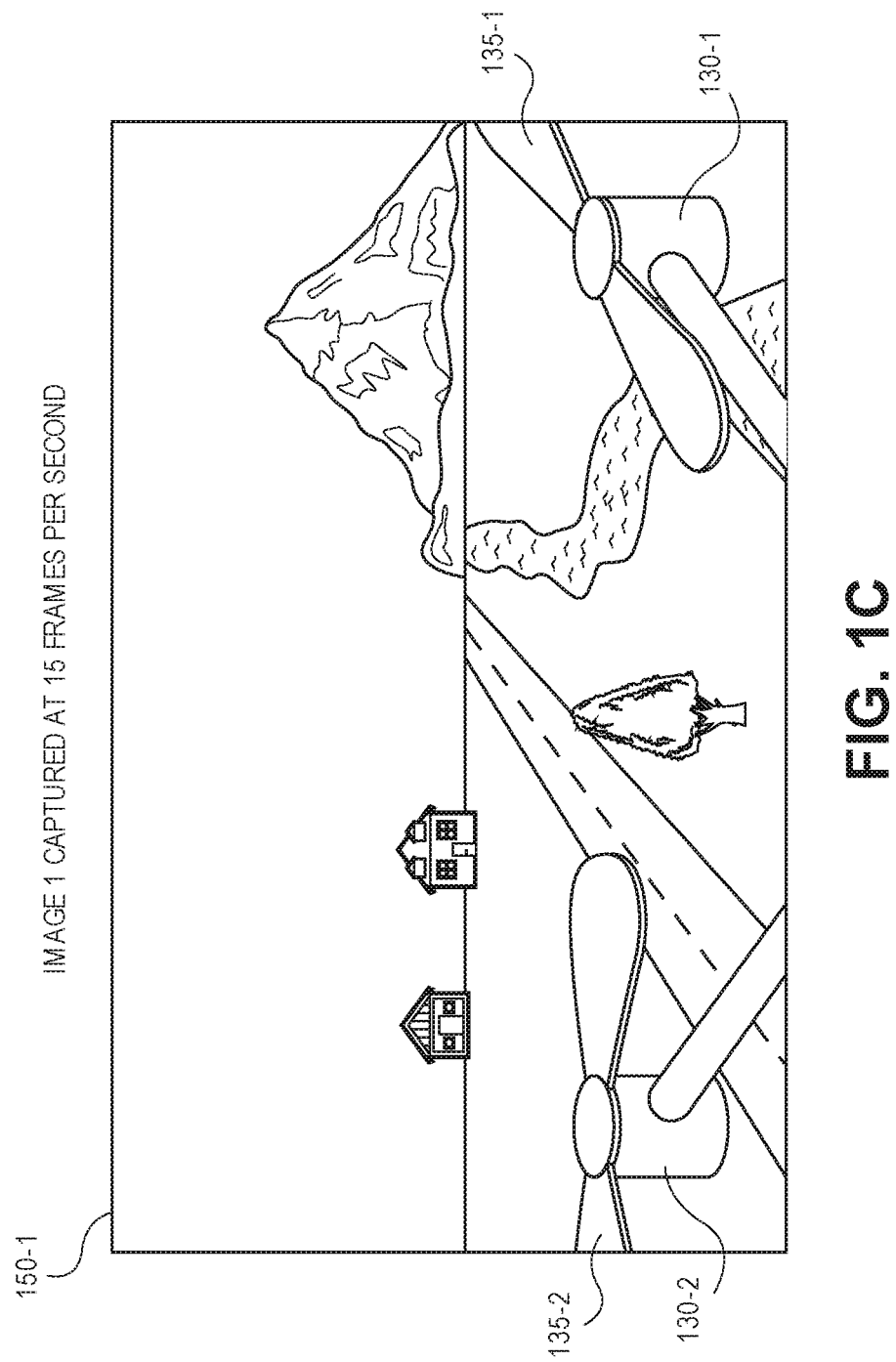
Figure 1D:
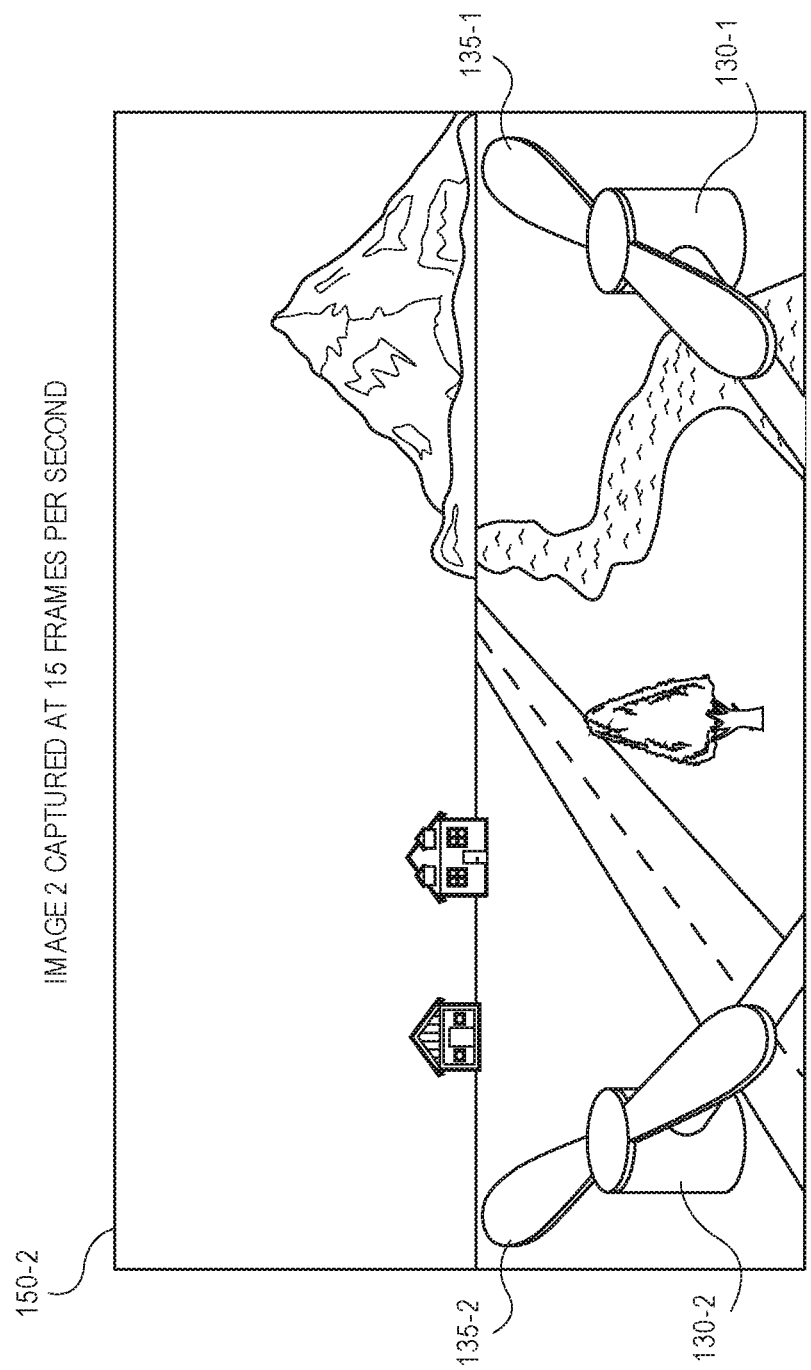

In accordance with some embodiments of the present disclosure, positions, angles, rotational speeds and directions of propellers aboard an aerial vehicle may be determined or controlled based on imaging data captured by one or more imaging devices provided aboard the aerial vehicle, including but not limited to imaging devices provided for navigation, monitoring, collision avoidance or one or more other applications, purposes or functions. Referring to FIG. 1C, a first image 150-1 captured by the imaging device 140 at a rate of approximately fifteen image frames per second (15 fps) is shown. The first image 150-1 depicts the ground-based and airborne features within the field of view 145, and also the propellers 135-1, 135-2 in their respective positions at the time at which the first image 150-1 was captured. Referring to FIG. 1D, a second image 150-2 captured by the imaging device 140 is shown. The second image 150-2 also depicts the ground-based and airborne features within the field of view 145, and the propellers 135-1, 135-2 in their respective positions at the time at which the second image 150-2 was captured. As is shown in FIGS. 1C and 1D, the first image 150-1 and the second image 150-2 are successively captured by the imaging device 140 at a frame rate of fifteen frames per second, such that an elapsed time Δt between the capture of the first image 150-1 and the capture of the second image 150-2 is a reciprocal of the frame rate, viz., $\frac{1}{15}$ seconds (or 0.0667 seconds). Alternatively, in some embodiments, any number of images may have been captured between the first image 150-1 and the second image 150-2, and an elapsed time between the capture of the first image 150-1 and the capture of the second image 150-2 may be determined based on a nominal number of reciprocals of the frame rate, viz., $\frac{1}{15}$ seconds multiplied by a number of images after the first image 150-1 at which the second image 150-2 was captured. In still other embodiments, each of the first image 150-1 and the second image 150-2 may be time-stamped, and may be stored in association with a time at which each of the first image 150-1 and the second image 150-2 was captured. An elapsed time between the capture of the first image 150-1 and the capture of the second image 150-2 may be determined based on the corresponding time stamps.

Figure 1E:
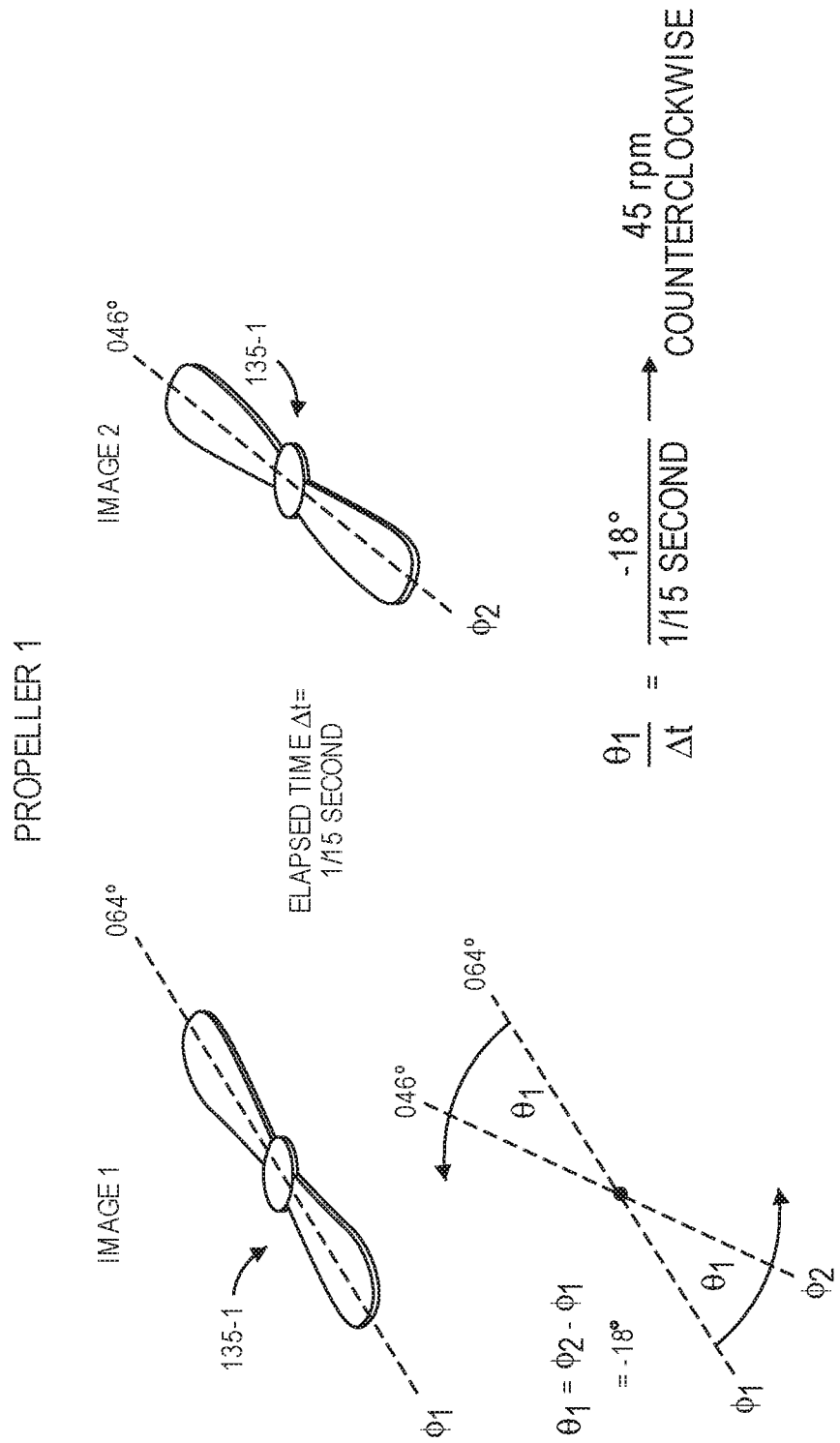

In accordance with some embodiments, images captured using the imaging device 140, e.g., the first image 150-1 and the second image 150-2, may be processed not only to determine positions, angles, rotational speeds and directions of the propellers 135-1, 135-2, but also for one or more other applications, purposes or functions, such as navigation, monitoring or collision avoidance. Referring to FIG. 1E, a rotational speed of the propeller 135-1 and a direction of rotation of the propeller 135-1 may be determined by detecting the propeller 135-1 in at least a pair of images captured by the imaging device 140, viz., the first image 150-1 and the second image 150-2, and processing the images to extract positions and angles of one or more blades of the propeller 135-1 from the images. For example, in some embodiments, the first image 150-1 and the second image 150-2, or portions thereof, may be subjected to image segmentation (e.g., thresholding or other processing techniques (e.g., filtering) to extract positions and angles of one or more of the blades. In some other embodiments, the first image 150-1 and the second image 150-2, or portions thereof, may be processed according to one or more machine learning techniques. For example, an artificial neural network, a classifier, or another machine learning system may be trained to recognize one or more portions of propellers (e.g., blades, hubs or other components) within imaging data. The first image 150-1 and the second image 150-2 may be provided to the artificial neural network, the classifier or the other machine learning system as inputs, the propeller 135-1 may be detected within the first image 150-1 and/or the second image 150-2 based on outputs received from the artificial neural network, the classifier or the other machine learning system.

An angular difference between an alignment of one or more blades of the propeller 135-1 depicted in the first image 150-1, and an alignment of the one or more blades of the propeller 135-1 depicted in the second image 150-2, may be divided by the elapsed time Δt between the first image 150-1 and the second image 150-2, to determine a rotational speed of the propeller 135-1, viz., forty-five revolutions per minute (45 rpm). A direction of rotation of the propeller 135-1, viz., counter-clockwise, may be likewise determined based on the relative positions of one or more of the blades of the propeller 135-1 in the first image 150-1 and the second image 150-2.

Figure 1F:
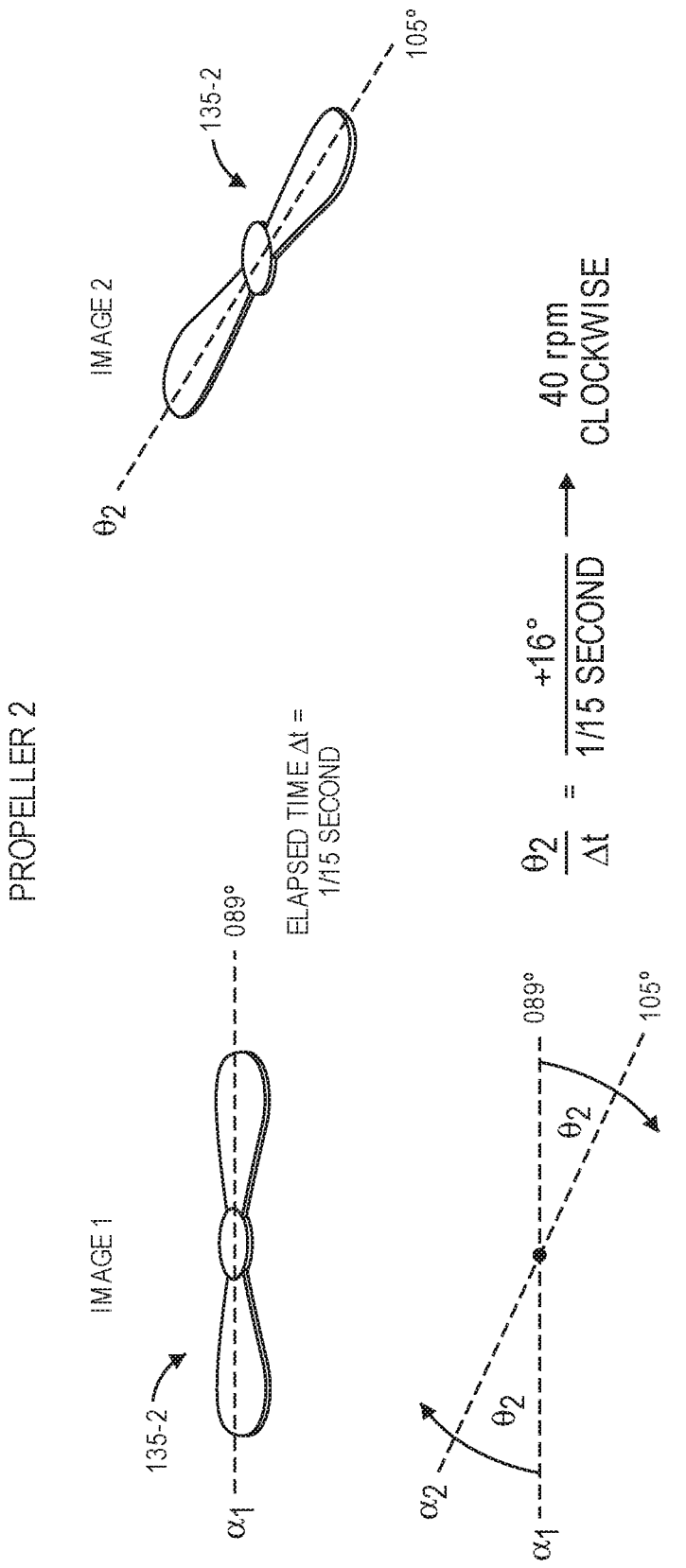

Similarly, referring to FIG. 1F, a rotational speed of the propeller 135-2 and a direction of rotation of the propeller 135-2 may be determined by detecting the propeller 135-2 in the first image 150-1 and the second image 150-2, and processing the first image 150-1 and the second image 150-2 to extract positions or angles of one or more blades of the propeller 135-1 from the first image 150-1 and the second image 150-2, viz., forty revolutions per minute and clockwise.

Accordingly, the systems and methods of the present disclosure may rely on imaging devices provided aboard aerial vehicles to capture images of operating propellers, and to process such images to detect one or more blades or other aspects of such propellers depicted therein. The images may be captured at specific times or rates, and positions or angles of the blades within the images may be determined and used to calculate rotational speeds and directions of the propellers. The aerial vehicles may be outfitted with any number of imaging devices, provided in any alignment or configuration, and images captured by such imaging devices may be utilized for any number of applications, purposes or functions.

Aerial vehicles are frequently equipped with one or more imaging devices which may be commonly used in a number of applications, purposes or functions, such as to aid in the guided or autonomous operation of an aerial vehicle, to detect one or more airborne or ground-based hazards, to determine when the aerial vehicle has arrived at or passed over a given location, to identify one or more landmarks, or the like. Aerial vehicles may be outfitted with imaging devices in any manner, e.g., by embedding or mounting imaging devices to one or more external surfaces of frames, motors, propellers, control surfaces, appurtenances or extensions, or other features. Where an aerial vehicle is outfitted with an imaging device, the imaging device is typically mounted in an orientation such that a field of view of the imaging device that extends above, forward of, laterally to, above or below the aerial vehicle, is as wide and as all-encompassing as possible. Some aerial vehicles are outfitted with two or more imaging devices having fields of view that provide full coverage in forward and aft, lateral, or vertical directions.

Many aerial vehicles utilize electric motors, e.g., brushless multi-phase direct current (or "DC") motors, for generating forces of lift and/or thrust during flight. Brushless DC motors are desired for their high power densities, reliability and simplicity, but typically require some form of position feedback for control. Position feedback may be determined through the use of hardware components such as encoders or other sensors, which are typically mounted to shafts or other rotating components and are effective over full speed ranges but are expensive and occasionally unreliable. Position feedback may also be determined by one or more software algorithms or techniques, which interpret measured phase voltage levels or current levels supplied to propulsion motors in order to determine their rotational speeds in a "sensorless" manner. Sensorless control methods work well at comparatively high speeds, but are ineffective at low speeds, and are often unable to discern directions of rotation.

Imaging data (e.g., visual imaging data, or depth imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network such as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus are sufficiently sharp, an imaging device may capture light that is reflected off objects of any kind to a sufficiently high degree of resolution using one or more sensors thereof, and store information regarding the reflected light in one or more data files.

Many imaging devices, including imaging devices that are provided aboard aerial vehicles, also include manual or automatic features for modifying their respective fields of view or orientations. For example, a digital camera may be configured in a fixed position, e.g., embedded into one or more surfaces or mounted to one or more supports of an aerial vehicle or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NN-NNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue may be expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Imaging devices may be mounted to aerial vehicles horizontally or vertically, e.g., in forward or aft orientations, or in upward or downward orientations, or at any other orientations or angles, which may be relative or absolute. The imaging devices may be homogenous (e.g., functionally equivalent or having the same capacities) or, alternatively, heterogeneous (e.g., having different capacities), and stereo images captured by such cameras for determining depths may be processed in multiple calculations. Images captured by each of the imaging devices may be used for stereo ranging purposes, e.g., by determining baseline distances or separations between such imaging devices, disparities of objects within such images, and focal lengths of the respective imaging devices.

The systems and methods of the present disclosure are directed to determining or controlling propeller speeds using imaging devices, by capturing a sequence of images regarding operating propellers, and processing the images to recognize the propellers and one or more of their blades depicted therein. In some embodiments, imaging devices (e.g., digital cameras) provided aboard an aerial vehicle may be used to monitor or observe rotations of one or more pairs of motors and propellers, and to use computer-vision algorithms or techniques to determine position information for informing one or more control systems as to angular orientations, rotational speeds and/or directions of such motors and propellers. In some embodiments, the images may be filtered or otherwise processed to determine angles of the blades within the respective images. Differences between the angles of the propellers as depicted within the frames, and times at which the frames were captured, may be used to determine speeds and directions about which the propellers are rotating, and positions of the respective blades, and information regarding such speeds, directions or positions may be used in support of one or more control functions aboard the aerial vehicle.

The systems and methods of the present disclosure may thus fill in a "feedback gap" that limits the performance of sensorless control systems for electric motors, such as brushless DC motors. For example, at low speeds, e.g., fifty to one hundred revolutions per minute (50 to 100 rpm), feedback to sensorless control systems is less effective than at high speeds. Therefore, when a motor is operating at low speeds, or is transitioning from one rotational direction to another, imaging data captured by one or more imaging devices may be processed to determine instantaneous positions of blades, to calculate rotational speeds and directions based on such positions, and to provide information regarding such positions, speeds and directions to one or more other components of the aerial vehicle, e.g., control systems for one or more of the motors and propellers, via a communications network or bus. Where an aerial vehicle is outfitted with one or more imaging devices for other applications, purposes or functions, the systems and methods of the present disclosure may utilize such imaging devices to capture images of operating motors and/or propellers, and thus need not require any additional hardware components. By enabling motors and controllers to be accurately controlled at low speeds, the systems and methods of the present disclosure enable propulsion motors aboard aerial vehicles to be operated under closed-loop control, thereby increasing the amount of motor torque that is available from such motors, and permitting direction-of-spin reversals with minimal risk of loss-of-synchronization control.

Propellers or portions thereof may be detected within imaging data in any manner. Likewise, once a propeller, or a portion thereof, has been detected in an image, a position or angle of the propeller within the image may be determined in any manner.

For example, in some embodiments, a propeller or a portion thereof may be detected by any recognition algorithms or techniques, including but not limited to detection algorithms or techniques, or image segmentation algorithms or techniques. In some embodiments, an image segmentation algorithm may segment an image, or a portion thereof, into one or more regions or segments defined by discontinuities determined from differences in intensity or by any other technique. In some embodiments, an image segmentation algorithm may segment an image, or a portion thereof, into one or more regions or segments based on their similarity to one another, such as by thresholding techniques, region growing techniques, region splitting techniques, or region merging techniques. Regions or segments of images may be analyzed to determine whether such regions or segments depict a portion of a propeller, e.g., a blade, a root, a hub or another portion.

Propellers, or portions thereof, may also be recognized in imaging data using trained machine learning systems or techniques (e.g., artificial neural networks or classifiers). First, in a training phase or mode, a machine learning system, or one or more computing devices or machines on which the system resides or operates, may receive images of portions of propellers (e.g., blades, roots, hubs, or the like), and images of objects that are not propellers. For example, where a machine learning system is to be executed by one or more processors aboard an aerial vehicle during operation, images of propellers aboard the aerial vehicle may be captured when the propellers are stationary or rotating. Alternatively, the images may be stock images of propellers of a same type or class as the propellers aboard the aerial vehicle, or images of other propellers. Alternatively, images of objects that may be detected within imaging data captured during the operation of the aerial vehicle, but are not propellers, e.g., ground-based features such as structures, plant life, or geologic formations or features, as well as airborne (or above-ground) objects such as other aerial vehicles, avian life, or celestial bodies, may also be identified or captured.

After a plurality of images of propellers and objects other than propellers have been identified or captured, the images may be subject to one or more annotation processes in which regions of such images that depict propellers are designated accordingly. In computer vision applications, annotation is commonly known as marking or labeling of images or video files captured from a scene, such as to denote the presence and location of one or more objects or other features within the scene in the images or video files. Annotating a video file typically involves placing a virtual marking such as a box (e.g., a bounding box) or other shape on an image frame of a video file, thereby denoting that the image frame depicts an object, or includes pixels of significance, within the box or shape. Alternatively, a video file may be annotated by applying markings or layers including alphanumeric characters, hyperlinks or other markings on specific frames of the video file, thereby enhancing the functionality or interactivity of the video file in general, or of the video frames in particular.

Images of propellers and other objects may be processed in order to extract patches of predetermined sizes or shapes therefrom. In some embodiments, foreground and/or background portions of an image may be identified by adaptive thresholding, e.g., by Otsu binarization, and a plurality of overlapping patches may be defined in a grid and extracted from the foreground portions. In some implementations, a grid of patches, each of which may have any size or overlapping stride, may be extracted from the foreground portions of the images.

In some embodiments, each of the patches may be labeled as "propeller" or "not a propeller" based on whether some or all of the patches depicts a portion of a propeller, such as blades, roots, hubs, or the like. For example, a patch may be identified as damaged if any portion of the patch intersects an annotation of a propeller blade, root, hub or other portion. Alternatively, each of the patches may be specifically annotated after the patches have been extracted from an image.

A data set may be defined by labeled patches extracted from images of propellers and other objects. The images and labels of the data set may be subdivided into a training set and a validation set, with the images and labels of the training set being used to train a machine learning tool, e.g., a classifier, such as a neural network, to recognize propellers in one or more images, and the images and labels of the validation set being used to test or confirm the validity of the trained machine learning tool.

Figure 2:
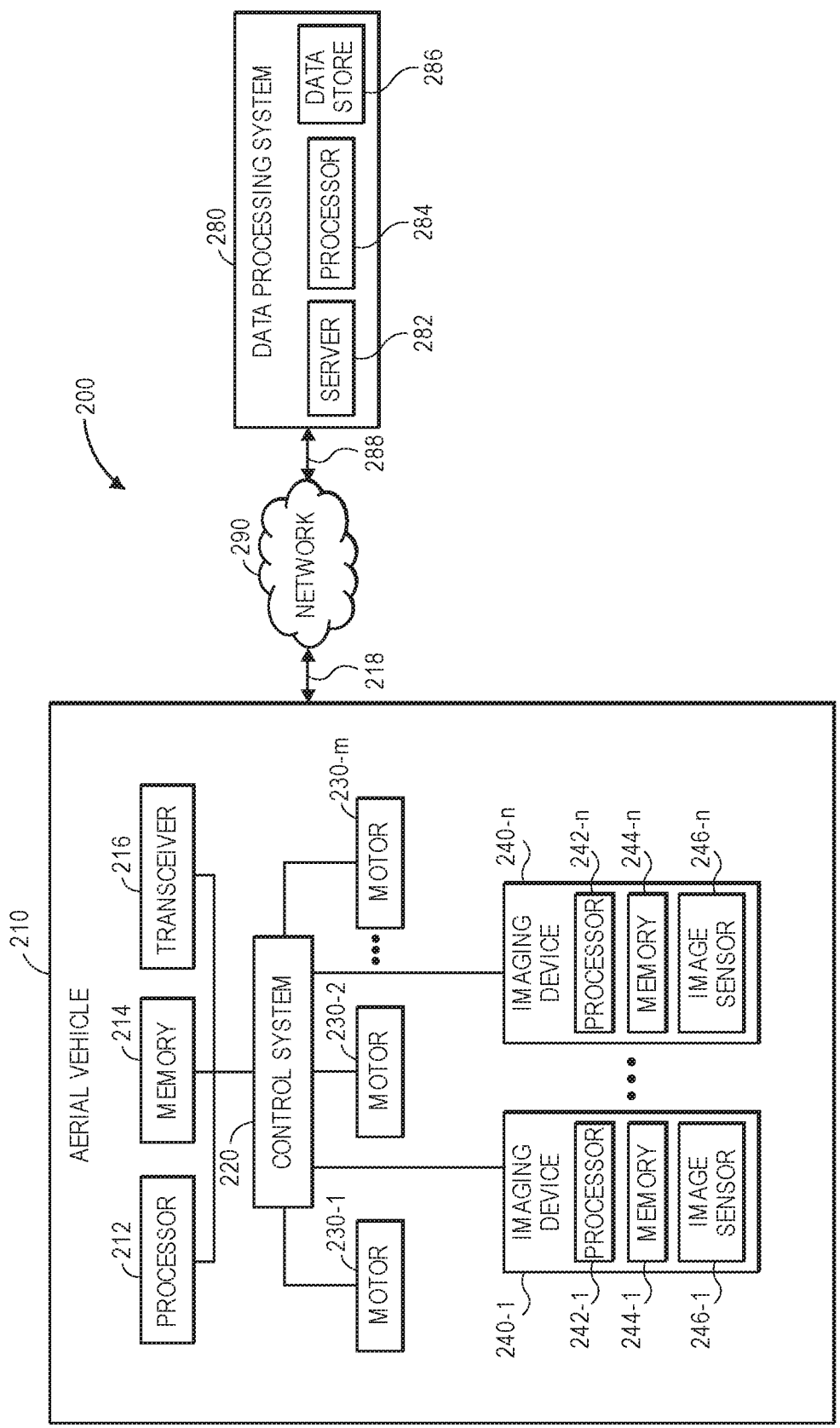
FIG. 2 is a block diagram of one system for determining or controlling propeller speeds using imaging devices in accordance with embodiments of the present disclosure.

Referring to FIG. 2, a block diagram of one system 200 for determining or controlling propeller speeds using imaging devices in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1F.

The aerial vehicle 210 includes a processor 212, a memory 214 and a transceiver 216. The aerial vehicle 210 further includes a control system 220, a plurality of propulsion motors 230-1, 230-2 . . . 230-$m$, and a plurality of imaging devices 240-1 . . . 240-$n$.

The processor 212 may be configured to perform any type or form of computing function associated with the operation of the aerial vehicle 210, including but not limited to the execution of one or more object recognition algorithms or techniques, e.g., for detecting one or more portions of a propeller within imaging data, or for determining a position or an angle of the propeller based on the imaging data. The processor 212 may also be configured to execute any other algorithms or techniques (e.g., machine learning systems or techniques) associated with one or more applications, purposes or functions, such as navigation, monitoring or collision avoidance, e.g., to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 230-1, 230-2 . . . 230-$m$ or the imaging devices 240-1 . . . 240-$n$. For example, the processor 212 may control the operation of one or more control systems or modules, such as the control system 220, for generating instructions for conducting operations of one or more of the propulsion motors 230-1, 230-2 . . . 230-$m$ or the imaging devices 240-1 . . . 240-$n$. Such control systems or modules may be associated with one or more other computing devices or machines, and may communicate with the data processing system 280 or one or more other computer devices (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, the propulsion motors 230-1, 230-2 . . . 230-m or the imaging devices 240-1 . . . 240-n. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 230-1, 230-2 . . . 230-m or the imaging devices 240-1 . . . 240-n, such as to cause one or more of the propulsion motors 230-1, 230-2 . . . 230-m to rotate propellers at desired speeds, in order to guide the aerial vehicle 210 along a determined or desired flight path, and to cause one or more of the imaging devices 240-1 . . . 240-n to capture any imaging data (e.g., still or moving images) as well as any associated audio data and/or metadata. The control system 220 may also operate the one or more propulsion motors 230-1, 230-2 . . . 230-m to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230-1, 230-2 . . . 230-m may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 230-1, 230-2 . . . 230-m may be a brushless DC multi-phase motor such as an outrunner brushless motor or an inrunner brushless motor.

The aerial vehicle 210 may include any number of such propulsion motors 230-1, 230-2 . . . 230-m of any kind. For example, one or more of the propulsion motors 230-1, 230-2 . . . 230-m may be aligned or configured to provide forces of lift to the aerial vehicle 210, exclusively, while one or more of the propulsion motors 230-1, 230-2 . . . 230-m may be aligned or configured to provide forces of thrust to the aerial vehicle 210, exclusively. Alternatively, one or more of the propulsion motors 230-1, 230-2 . . . 230-m may be aligned or configured to provide forces of lift and forces of thrust to the aerial vehicle 210, as needed. For example, the propulsion motors 230-1, 230-2 . . . 230-m may be fixed in their orientation on the aerial vehicle 210, or configured to vary their respective orientations, e.g., a tilt-rotor aircraft. Moreover, the propulsion motors 230-1, 230-2 . . . 230-m may be aligned or configured to operate with different capacities or ratings, or at different speeds, or coupled to propellers having different sizes and shapes. Additionally, one or more of the propulsion motors 230-1, 230-2 . . . 230-m may be an electric motor, e.g., a brushless DC multi-phase motor, and one or more of the propulsion motors 230-1, 230-2 . . . 230-m may be a gasoline-powered motor.

Each of the propulsion motors 230-1, 230-2 . . . 230-m may be coupled to one or more propellers (or rotors or rotatable systems) having a plurality of shaped blades joined to a hub or boss. For example, each of such propellers may be rotatably mounted to a mast or shaft associated with a respective one of the propulsion motors 230-1, 230-2 . . . 230-m and configured to generate forces of thrust when rotated within a fluid. Each of such propellers may include any number of blades, and may be fixed pitch, adjustable pitch or variable pitch in nature. Moreover, one or more of such propellers may be banded or shielded in any manner. Additionally, one or more of the propellers may further include visible markings on one or more aspects of the propellers, including but not limited to faces of such blades, leading or trailing edges of such blades, or tips or roots of such blades. In some embodiments, the visible markings may include one or more lines, shapes, patterns, colors, textures, alphanumeric characters, symbols or any other markings that may be detected and recognized within imaging data captured using one or more of the imaging devices 240-1 . . . 240-n.

In some embodiments, one or more of the propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

Although the block diagram of FIG. 2 includes three boxes corresponding to propulsion motors 230-1, 230-2 . . . 230-*m*, those of ordinary skill in the pertinent arts will recognize that any number or type of propulsion motors may be provided aboard the aerial vehicle 210 in accordance with the present disclosure.

The imaging devices 240-1 . . . 240-*n* may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging devices 240-1 . . . 240-*n* may include one or more processors 242-1 . . . 242-*n*, one or more memory or storage components 244-1 . . . 244-*n*, and one or more image sensors 246-1 . . . 246-*n*, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). Such imaging devices 240-1 . . . 240-*n* may capture imaging data in the form of one or more still or moving images of any kind or form, as well as any relevant audio signals or other information during the operation of the aerial vehicle 210.

The imaging devices 240-1 . . . 240-*n* may be mounted, fixed, embedded or otherwise joined to one or more external surfaces of the aerial vehicle 210 in any manner and in any orientation or alignment to capture imaging data from above the aerial vehicle 210. For example, one or more of the imaging devices 240-1 . . . 240-*n* may be coupled to any form of support system or structure for maintaining the lenses or other optical elements of the imaging devices 240-1 . . . 240-*n* at a selected orientation or configuration. Alternatively, the imaging devices 240-1 . . . 240-*n* may be mounted, fixed, embedded or otherwise joined to external surfaces of the aerial vehicle 210 in any other manner.

The imaging devices 240-1 . . . 240-*n* may communicate with the processor 212 and/or the control system 220, or with one another, by way of a wired or wireless connection that may be dedicated or comprise all or part of an internal network (not shown), e.g., an internal communications bus. Additionally, the imaging devices 240-1 . . . 240-*n* may be adapted or otherwise configured to communicate with the data processing system 280 by way of the network 290. Although the block diagram of FIG. 2 includes two boxes corresponding to imaging devices 240-1 . . . 240-*n*, those of ordinary skill in the pertinent arts will recognize that any number or type of imaging devices may be provided aboard the aerial vehicle 210 in accordance with the present disclosure, including but not limited to digital cameras, depth sensors or range cameras, infrared cameras, radiographic cameras or other optical sensors.

In addition to the imaging devices 240-1 . . . 240-*n*, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 282 may be connected to or otherwise communicate with the processors 284 and the data stores 286, which may store any type of information or data, including but not limited to acoustic signals, information or data relating to imaging data, or information or data regarding environmental conditions, operational characteristics, or positions, for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212 or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, an aerial vehicle may include imaging devices that are configured to capture imaging data and to process such imaging data to determine or control propeller speeds, e.g., by detecting blades or other aspects of a propeller within two or more images, and determining angular orientations of such blades within the images, which may also be processed and used in support of one or more operational applications, purposes or functions of the aerial vehicle.

Figure 3A:
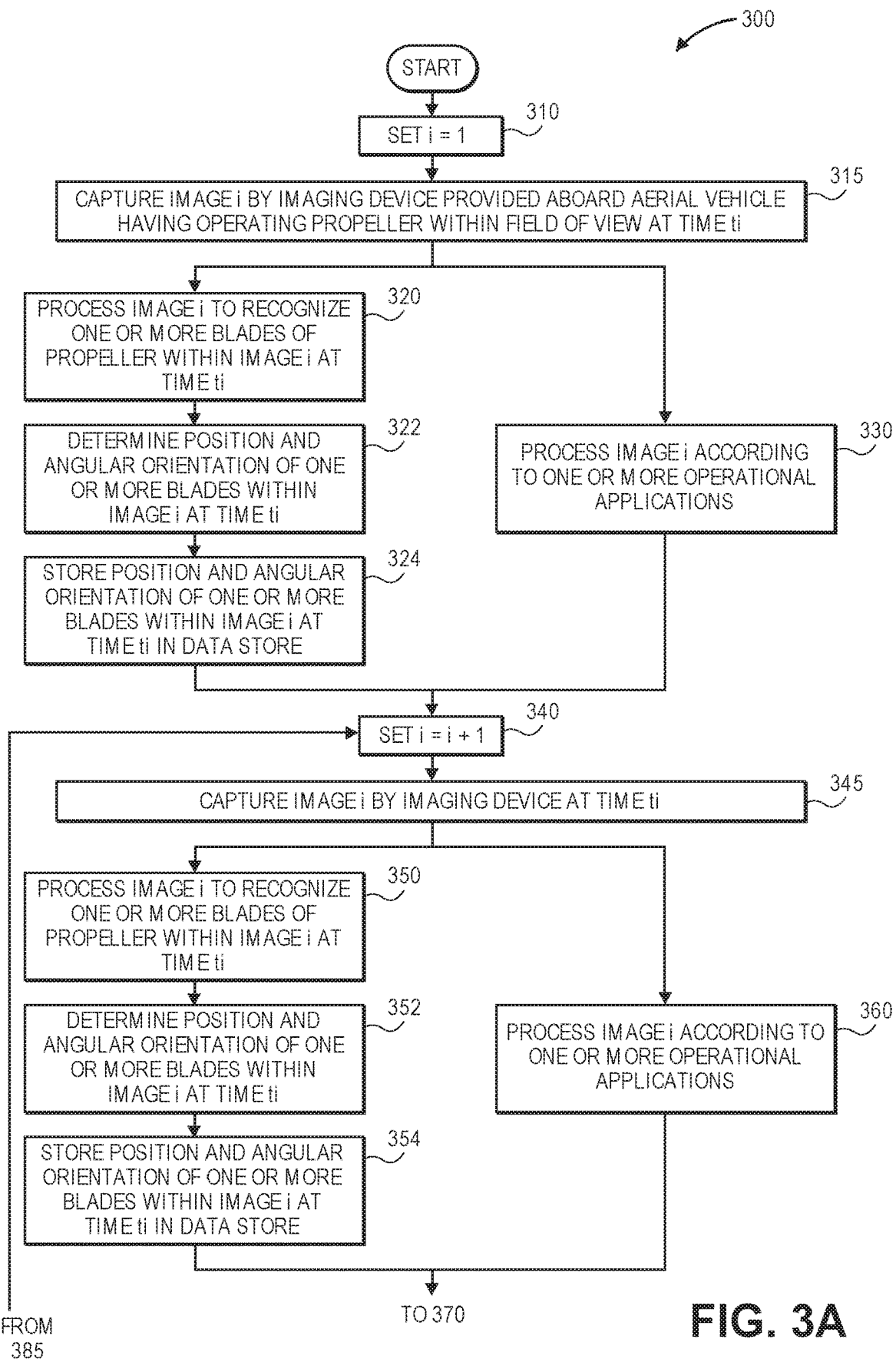
FIGS. 3A and 3B are a flow chart of one process for determining or controlling propeller speeds using imaging devices in accordance with embodiments of the present disclosure.
Figure 3B:
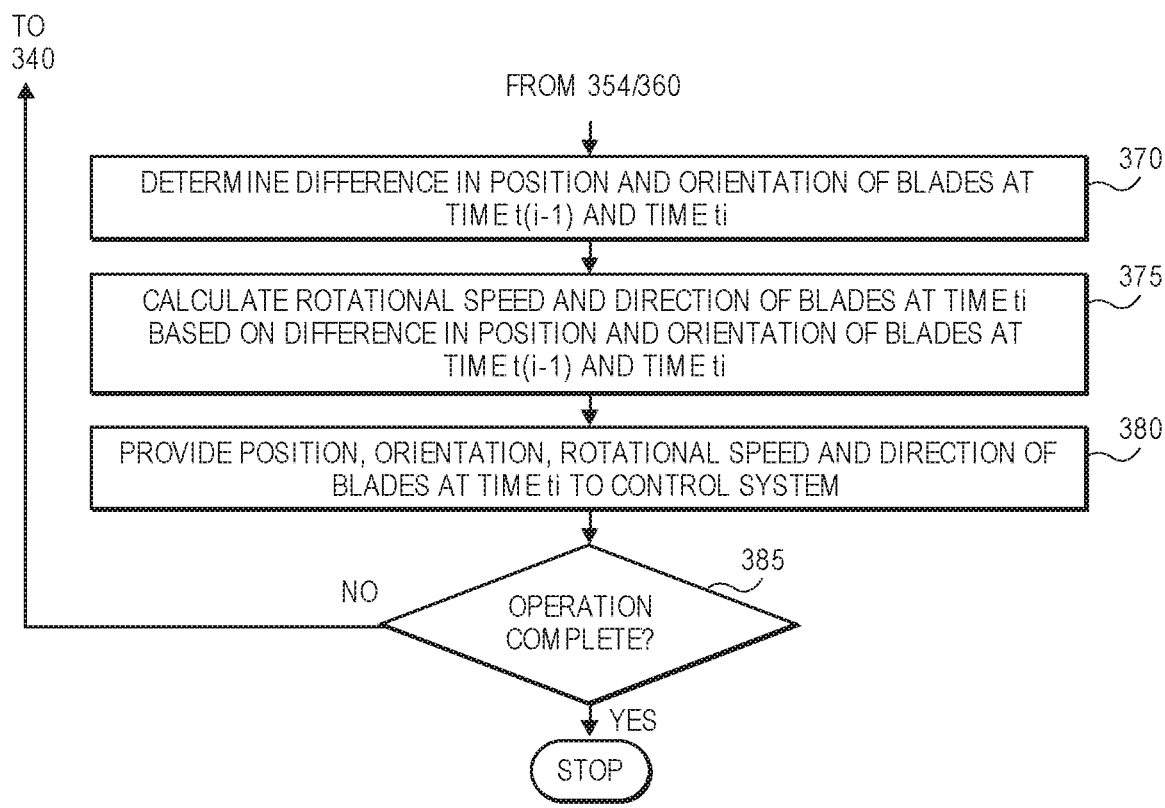

Referring to FIGS. 3A and 3B, a flow chart 300 of one process for determining or controlling propeller speeds using imaging devices in accordance with embodiments of the present disclosure is shown. At box 310, a value of a step variable i is set to equal one, or i=1. At box 315, an image i is captured by an imaging device provided aboard an aerial vehicle that includes an operating propeller within a field of view at time $t_i$. The imaging device may be the only imaging device aboard the aerial vehicle, or one of a plurality of imaging devices aboard the aerial vehicle, and may feature a field of view having any angle of view that is aligned in fixed or variable orientations with respect to a direction of travel of the aerial vehicle. The imaging device may be provided for performing any number of applications, purposes or functions while the aerial vehicle is stationary or in forward-flight, vertical-flight or hovering operations.

At box 320, the image i is processed to recognize one or more blades of the propeller therein. In some embodiments, the image i may be processed according to any number of detection and/or recognition algorithms or techniques, to identify attributes of any points of the propeller that are represented in the image i, including but not limited to any edges, contours, outlines, colors, textures, silhouettes, shapes or other characteristics of the propeller, or portions of the propeller, expressed therein using one or more algorithms or machine-learning tools. In some embodiments, the propeller may include one or more lines, shapes, patterns, colors, textures, alphanumeric characters, symbols or any other markings to aid in the identification of the blades within images captured by the imaging device. At box 322, a position and an angular orientation of one or more blades of the propeller are identified within the image i at the time $t_i$, and at box 324, the position and the angular orientation of the one or more blades depicted within the image i at the time $t_i$ are stored in one or more data stores. For example, the image i may be subjected to image segmentation (e.g., thresholding or other processing techniques, such as filtering), to extract positions and angles of one or more of the blades.

In parallel, at box 330, the image i is processed according to one or more operational applications. For example, the image i may be searched for one or more landmarks, ground-based or airborne hazards, or other objects of interest, according to one or more other detection and/or recognition algorithms or techniques. Information or data regarding the contents of the image i with respect to one or more requirements of the operational applications may be stored in the one or more data stores.

At box 340, the value of the step variable i is incremented by one, or i is set to equal i+1. After the value of the step variable i is incremented by one, the process advances to box 345, where an image i is captured by the imaging device provided aboard the aerial vehicle at time $t_i$. At box 350, the image i is processed to recognize one or more blades of the propeller therein. At box 352, a position and an angular orientation of one or more blades of the propeller are identified within the image i at the time $t_i$, and at box 354, the position and the angular orientation of the one or more blades depicted within the image i at the time $t_i$ are stored in one or more data stores. In parallel, at box 360, the image i is processed according to one or more operational applications, e.g., navigation, monitoring or collision avoidance. For example, an aerial vehicle may select a course, a speed or an altitude based at least in part on contents of the image i, or on any other basis.

At box 370, a difference in the positions and the angular orientations of the blades of the propeller at the time $t_{(i-1)}$ and the time $t_i$ are determined, e.g., based on the image (i−1) and the image i. At box 375, the rotational speed and direction of the blades at time $t_i$ are determined based on the difference in the positions and the angular orientations of the blades at the time $t_{(i-1)}$ and the time $t_i$. At box 380, the positions, the angular orientations, the rotational speed and direction of the blades are provided to a control system, e.g., a controller for the aerial vehicle as a whole, such as the control system 220 of FIG. 2, or controllers for one or more propulsion motors. For example, in some embodiments, the rotational speed and direction may be compared to rotational speeds and directions determined by one or more hardware components (e.g., encoders) or software algorithms (e.g., sensorless techniques), in order to validate or confirm such speeds or directions. Alternatively, the rotational speed and direction may be used for any other purpose.

At box 385, whether the operation of the aerial vehicle is complete is determined. For example, the aerial vehicle may have arrived at a selected location or waypoint, retrieved or deployed one or more items, or otherwise completed the requirements of one or more missions with which the aerial vehicle has been tasked. If the operation of the aerial vehicle is complete, then the process ends. If the operation of the aerial vehicle is not complete, however, then the process returns to box 340, where the value of the step variable i is incremented by one, and to box 345, where an image i is captured by the imaging device.

As is discussed above, one or more images captured using imaging devices having all or portions of a propulsion motor, a propeller or other rotatable components within their respective fields of view, may be processed to detect positions or angles of such components within the images, and determine rotational speeds or directions based on such positions or angles, e.g., by image segmentation, thresholding, filtering, machine learning, or any other processing techniques to extract positions and angles of one or more of the blades. Referring to FIGS. 4A through 4D, views of aspects of one system for determining or controlling propeller speeds using imaging devices in accordance with embodiments of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1F.

Figure 4A:
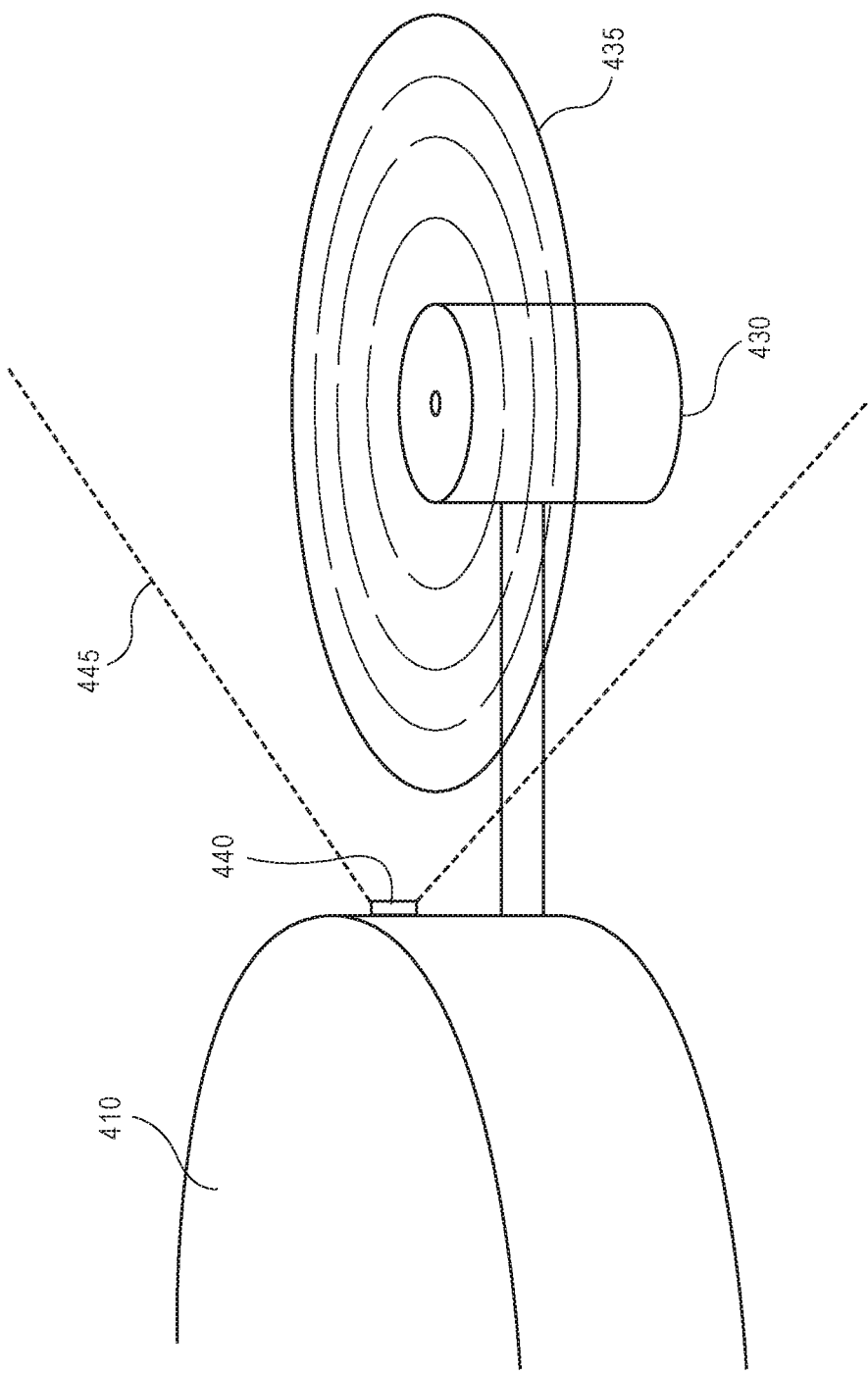
FIGS. 4A through 4D are views of aspects of one system for determining or controlling propeller speeds using imaging devices in accordance with embodiments of the present disclosure.
Figure 4B:
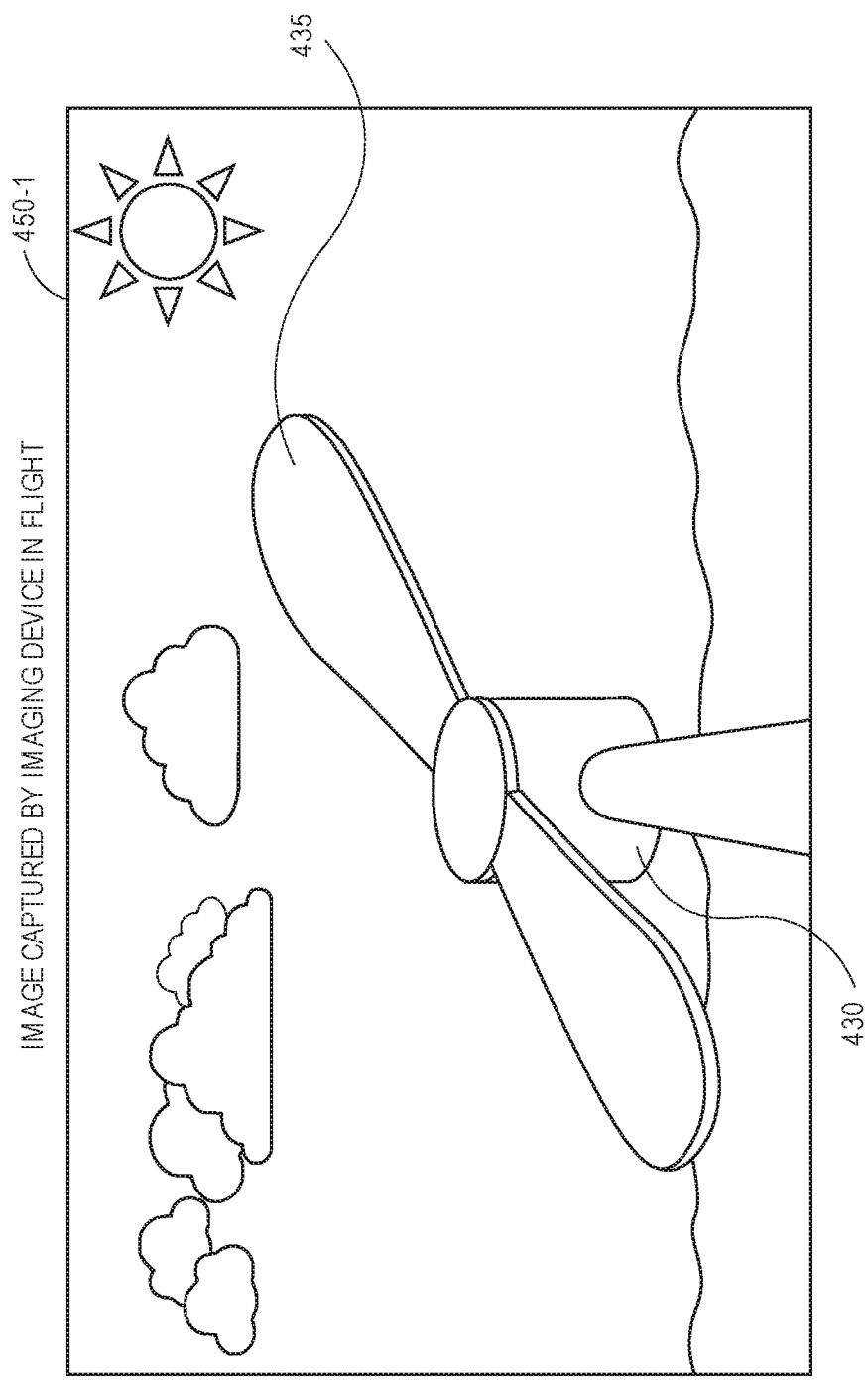

Referring to FIG. 4A, a portion of an aerial vehicle 410 including a propulsion motor 430 and an imaging device 440 is shown. The propulsion motor 430 is coupled to and is rotating a propeller 435 about an axis defined by a shaft or other component. The imaging device 440 is embedded or mounted to an external surface of a frame of the aerial vehicle 410, and aligned with a field of view 445 that includes all or a portion of the propulsion motor 430 and the propeller 435. Referring to FIG. 4B, an image 450-1 captured by the imaging device 440 depicts ground-based and/or airborne background features, and the propeller 435 and the propulsion motor 430 in positions at a time that the imaging device 440 captured the image 450-1.

Figure 4C:
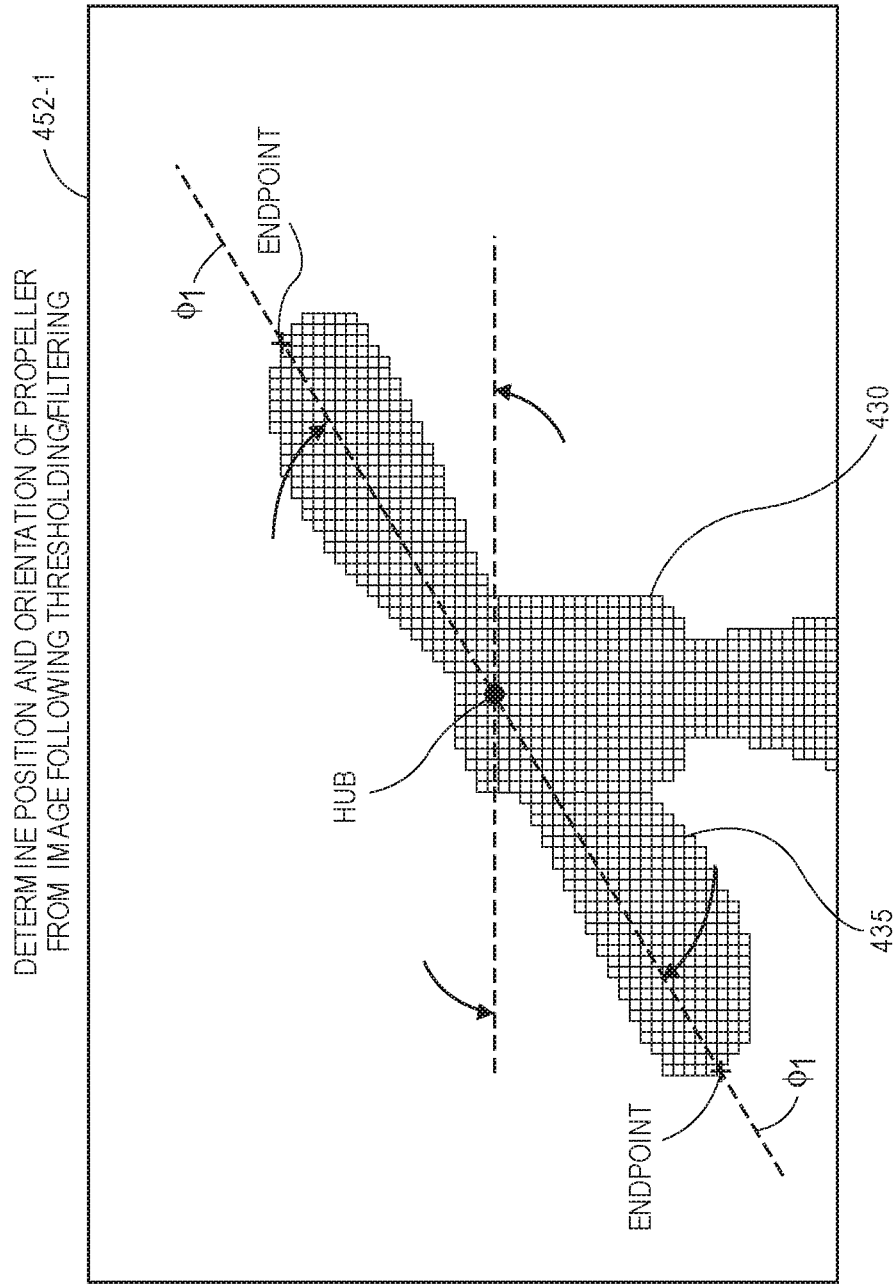

Referring to FIG. 4C, the image 450-1 is shown after having been thresholded and/or filtered into a binarized image 452-1 from which positions of endpoints and a hub of the propeller 435 may be detected. An angle $\phi_1$ of alignment representing an orientation of the propeller 435 within the binarized image 452-1 is determined by extending a line from the endpoints through the hub. In some embodiments, the positions and/or angles of the propeller 435 within the image 450-1 may be determined in any other manner, such as by histogram matching, e.g., matching histograms derived from images (viz., the image 450-1) to training histograms representing such objects in one or more positions or angular orientations, at various lighting or environmental conditions, as well as binary intensity or connectivity analyses, nearest neighbor analyses, ellipse fitting, or any other computer-vision and/or machine learning techniques.

In some embodiments, portions of the image 450-1 may be provided to a machine learning system or technique that is trained to recognize all or portions of propellers therein. For example, one or more patches of the image 450-1 may be defined and extracted therefrom, and provided to an artificial neural network as inputs. The artificial neural network may have been trained using images of propellers, and of other objects that may be expected to appear within imaging data captured using the imaging device 440, e.g., structures, plant life, geologic formations or features, aerial vehicles, avian life, or celestial bodies, or others. The patches may be identified and extracted from the image 450-1 as a whole, or from selected portions of the image 450-1 in which an image is determined to most likely include a propeller, viz., central portions of the image 450-1, rather than one or more portions of the image 450-1 about a perimeter.

Figure 4D:
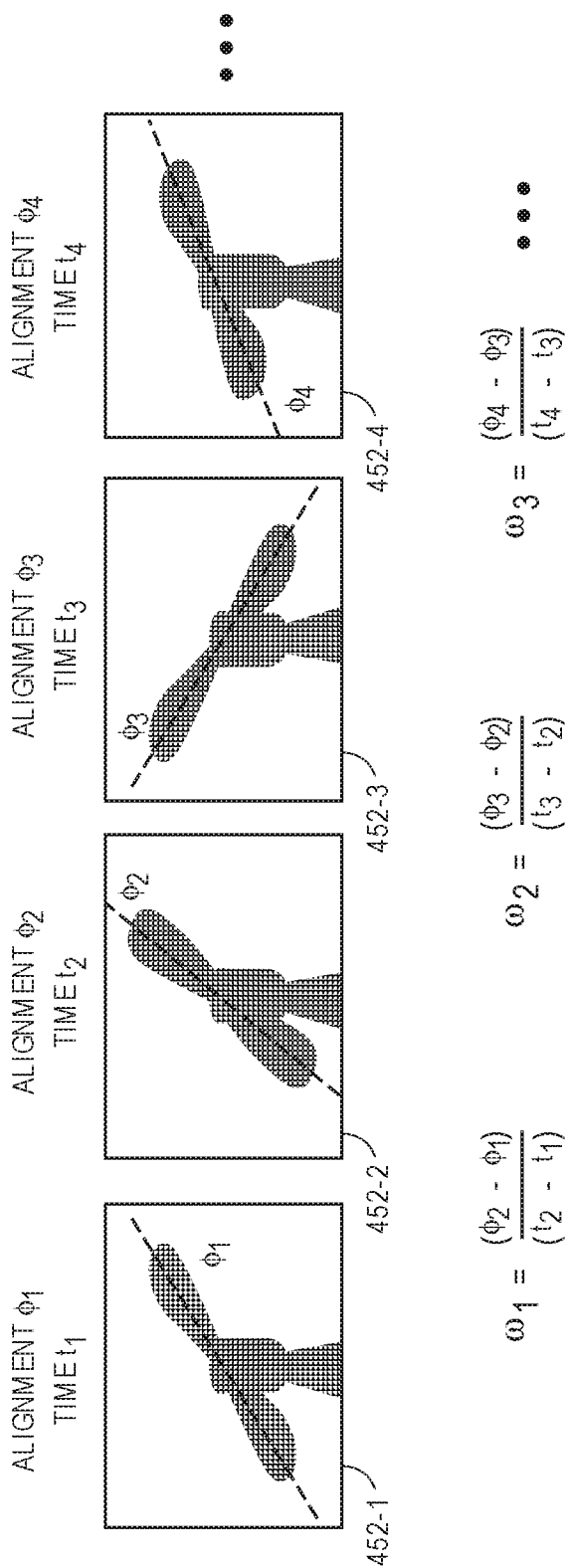

Positions or angles of propellers or other rotating components determined by processing a plurality of images may be used to calculate rotational speeds and directions of rotation of such propellers. Referring to FIG. 4D, a plurality of binarized images 452-1, 452-2, 452-3, 452-4 are shown. Like the binarized image 452-1 of FIG. 4C, each of the binarized images 452-2, 452-3, 452-4 depicts the propeller 435 at an angle $\phi_1, \phi_2, \phi_3, \phi_4$ of alignment. Using the angles $\phi_1, \phi_2, \phi_3, \phi_4$ of alignment of the propeller 435, and the times $t_1, t_2, t_3, t_4$ at which the images 450-1, 450-2, 450-3, 450-4 were captured, rotational velocities (e.g., speeds and directions) $\omega_1, \omega_2, \omega_3, \omega_4$ of the propeller 435 may be calculated on either a differential or instantaneous basis over time. In some embodiments, angles of propellers 435 may be determined from any other data extracted from or associated with the image 450-1. The systems and methods disclosed herein are not limited to the use of binarized images, such as the binarized images 452-1, 452-2, 452-3, 452-4 of FIG. 4D, to determine angles of alignment or positions of blades, to calculate rotational speeds or to determine rotational directions.

Subsequently, or concurrently, one or more of the images captured by an imaging device having a propeller, a propulsion motor or another rotating component within a field of view may be used to determine a rotational speed or direction of the propeller, the propulsion motor or the other rotating component, and also for any other applications, purposes or functions, such as navigation, monitoring or collision avoidance. Referring to FIGS. 5A through 5H, views of aspects of one system for determining or controlling propeller speeds using imaging devices in accordance with embodiments of the present disclosure are shown. Except where otherwise noted, reference numerals preceded by the number "5" shown in FIGS. 5A through 5H indicate components or features that are similar to components or features having reference numerals preceded by the number "4" shown in FIGS. 4A through 4D, by the number "2" shown in FIG. 2 or by the number "1" shown in FIGS. 1A through 1F.

Figure 5A:
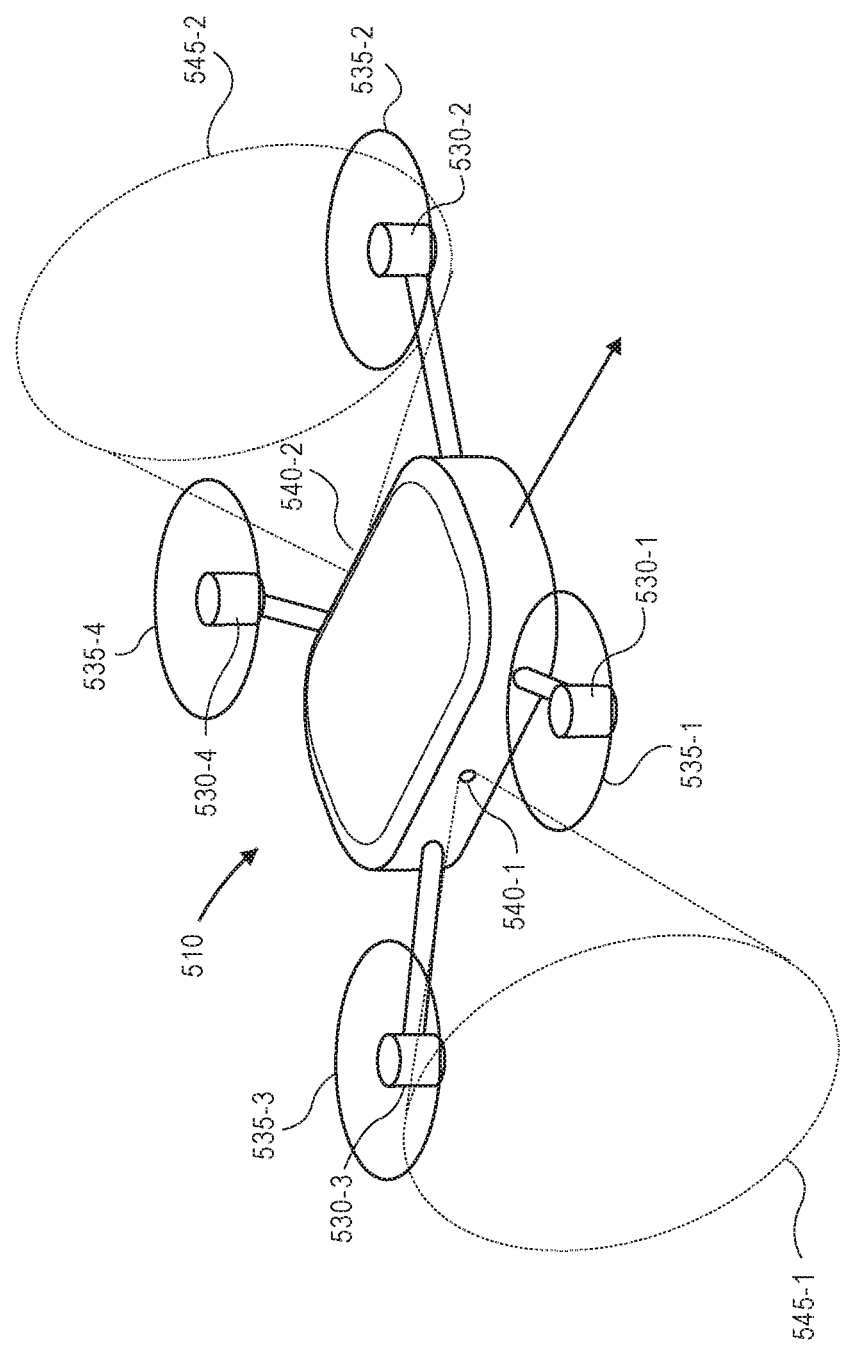

Referring to FIG. 5A, an aerial vehicle 510 includes a plurality of propulsion motors 530-1, 530-2, 530-3, 530-4 and a plurality of imaging devices 540-1, 540-2. Each of the propulsion motors 530-1, 530-2, 530-3, 530-4 is coupled to and is rotating a propeller 535-1, 535-2, 535-3, 535-4 about an axis defined by a shaft or other component. The imaging devices 540-1, 540-2 are embedded or mounted to an external surface of a frame of the aerial vehicle 510, e.g., on starboard and port sides of the aerial vehicle 510, respectively. The imaging device 540-1 includes portions of the propulsion motors 530-1, 530-3 and the propellers 535-1, 535-3 within a field of view 545-1, while the imaging device 540-2 includes portions of the propulsion motors 530-2, 530-4 and the propellers 535-2, 535-4 within a field of view 545-2.

Referring to FIG. 5B, a first image 550-1 captured at a time $t_1$ using the imaging device 540-1 is shown. The image 550-1 depicts positions of the propellers 535-1, 535-3 at the time $t_1$. The image 550-1 also depicts a landmark (viz., a lighthouse) 560-1, an aerial vehicle 560-2 and a bird 560-3 (or other airborne features) within the field of view 545-1 at the time $t_1$.

Figure 5C:
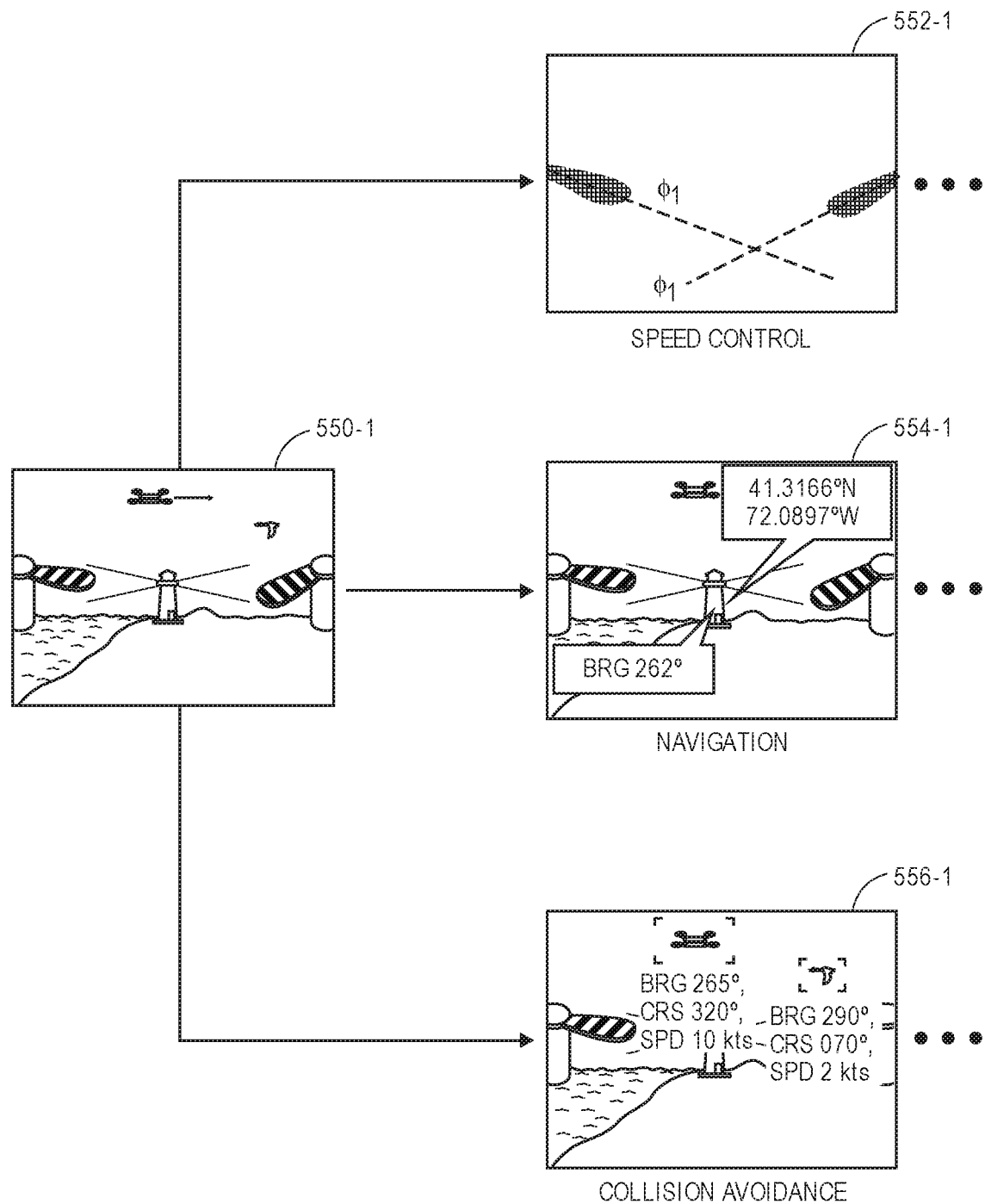

The image 550-1 may be used for multiple applications, purposes or functions, including not only determining rotational speeds and directions of the propellers 535-1, 535-3, but also for navigation or collision avoidance, or any other applications, purposes or functions. Referring to FIG. 5C, a binarized image 552-1 generated based on the image 550-1 may be processed to detect the positions of the propellers 535-1, 535-3, and to determine angles $\phi_1$, $\alpha_1$ of alignment of the propellers 535-1, 535-3 depicted therein at the time $t_1$. Likewise, a record 554-1 of positions of and bearings to landmarks within the image 550-1, viz., the landmark 560-1, may be generated and used for navigation purposes, e.g., to determine a position of the aerial vehicle 510, or to guide the aerial vehicle 510 with respect to objects in known, fixed positions. Additionally, a record 556-1 of one or more airborne hazards, such as the aerial vehicle 560-2 and the bird 560-3, including bearings to the aerial vehicle 560-2 and the bird 560-3, courses of the aerial vehicle 560-2 and the bird 560-3, and speeds of the aerial vehicle 560-2 and the bird 560-3, as determined from the image 550-1, may be generated and used for collision avoidance purposes, e.g., to determine whether such airborne hazards may pose a threat to the safe operation of the aerial vehicle 510 during the performance of one or more missions.

Figure 5E:
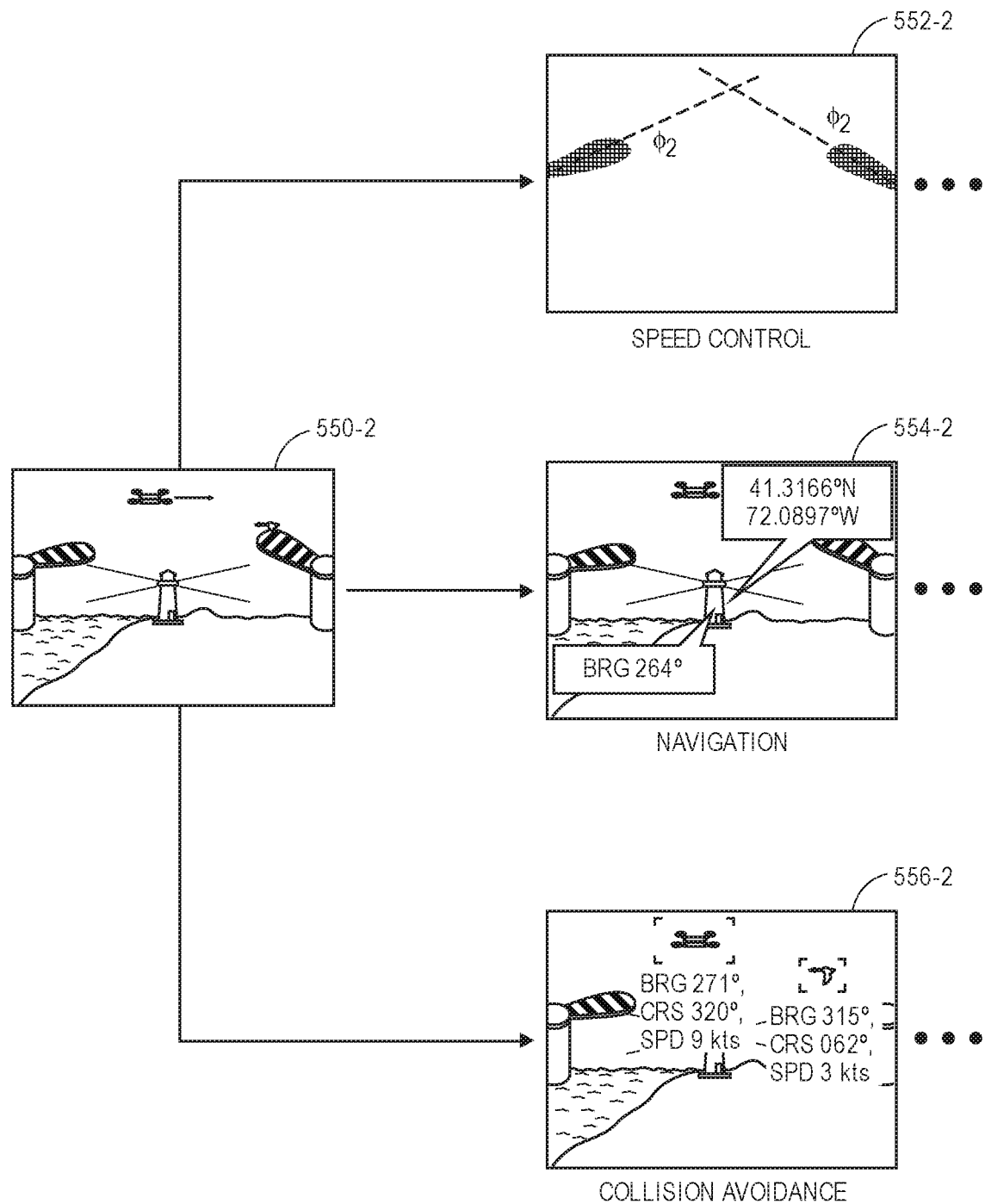

Referring to FIG. 5D, a second image 550-2 captured at a time $t_2$ using the imaging device 540-1 is shown. The image 550-2 depicts positions of the propellers 535-1, 535-3 at the time $t_2$. The image 550-2 also depicts the landmark 560-1, the aerial vehicle 560-2 and the bird 560-3 within the field of view 545-1 at the time $t_2$. Referring to FIG. 5E, a binarized image 552-2, a record 554-2 and a record 556-2 generated based on the image 550-2 are shown. The binarized image 552-2 may be processed to detect the positions of the propellers 535-1, 535-3, and to determine angles $\phi_2$, $\alpha_2$ of alignment of the propellers 535-1, 535-3 depicted therein at the time $t_2$. The record 554-2 may be generated and used to update a position of the aerial vehicle 510 with respect to the landmark 560-1 or any objects in known, fixed positions. Additionally, the record 556-2 may be generated and used to update the positions of the aerial vehicle 560-2 and the bird 560-3, e.g., for collision avoidance purposes, e.g., to track the aerial vehicle 560-2 and the bird 560-3, and to ensure that the aerial vehicle 560-2 and the bird 560-3 do not pose a threat to the safe operation of the aerial vehicle 510.

Figure 5G:
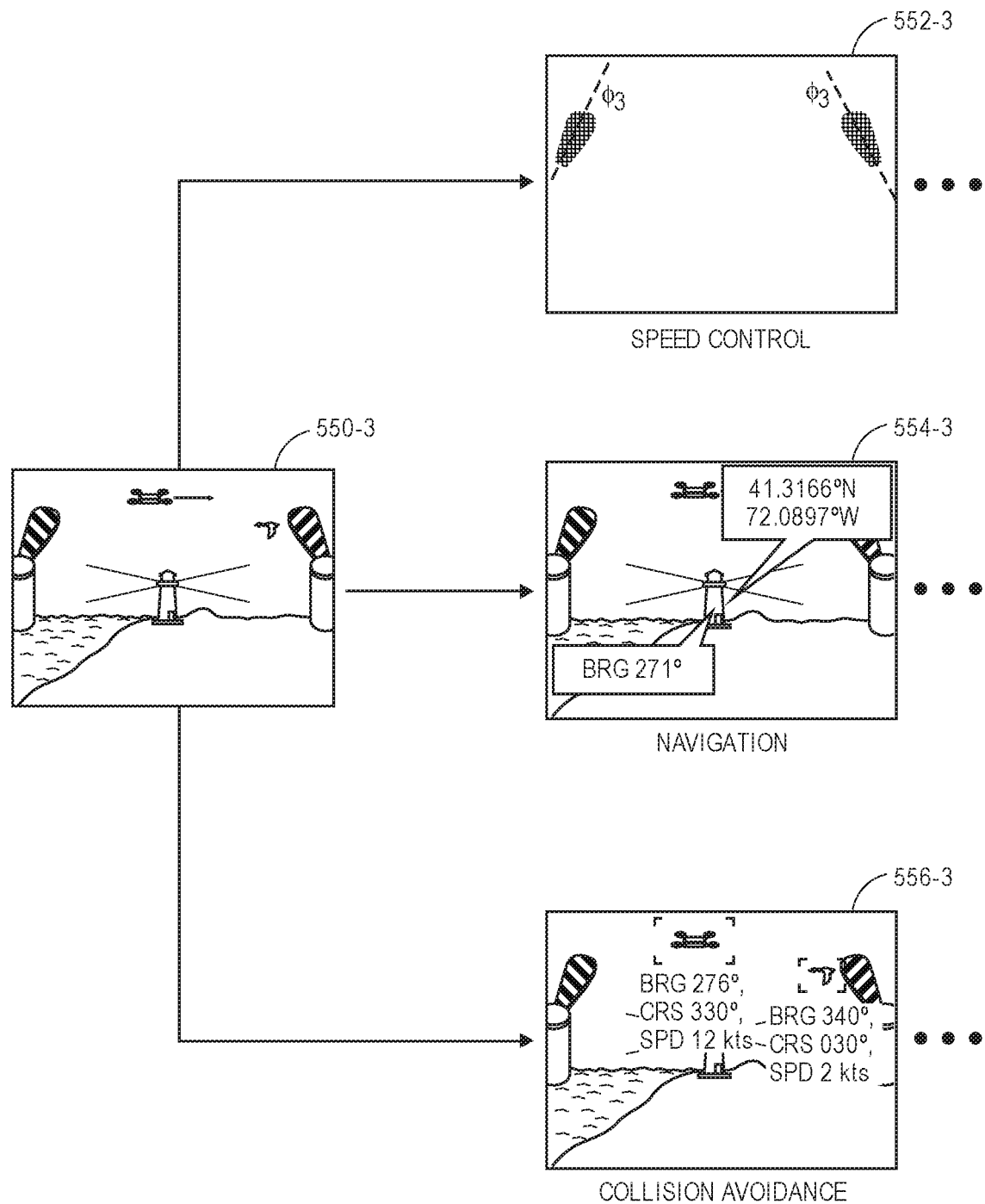

Likewise, referring to FIG. 5G, a third image 550-3 captured at a time $t_3$ using the imaging device 540-1 is shown. The image 550-3 depicts positions of the propellers 535-1, 535-3 at the time $t_3$. The image 550-3 also depicts the landmark 560-1, the aerial vehicle 560-2 and the bird 560-3 within the field of view 545-1 at the time $t_3$. Referring to FIG. 5G, a binarized image 552-3, a record 554-3 and a record 556-3 generated based on the image 550-3 are shown. The binarized image 552-3 may be processed to detect the positions of the propellers 535-1, 535-3, and to determine angles $\phi_3$, $\alpha_3$ of alignment of the propellers 535-1, 535-3 depicted therein at the time $t_3$. The record 554-3 may be generated and used to update a position of the aerial vehicle 510 with respect to the landmark 560-1 or any objects in known, fixed positions. Additionally, the record 556-3 may be generated and used to update the positions of the aerial vehicle 560-2 and the bird 560-3, e.g., for collision avoidance purposes, e.g., to track the aerial vehicle 560-2 and the bird 560-3, and to ensure that the aerial vehicle 560-2 and the bird 560-3 do not pose a threat to the safe operation of the aerial vehicle 510.

Figure 5H:
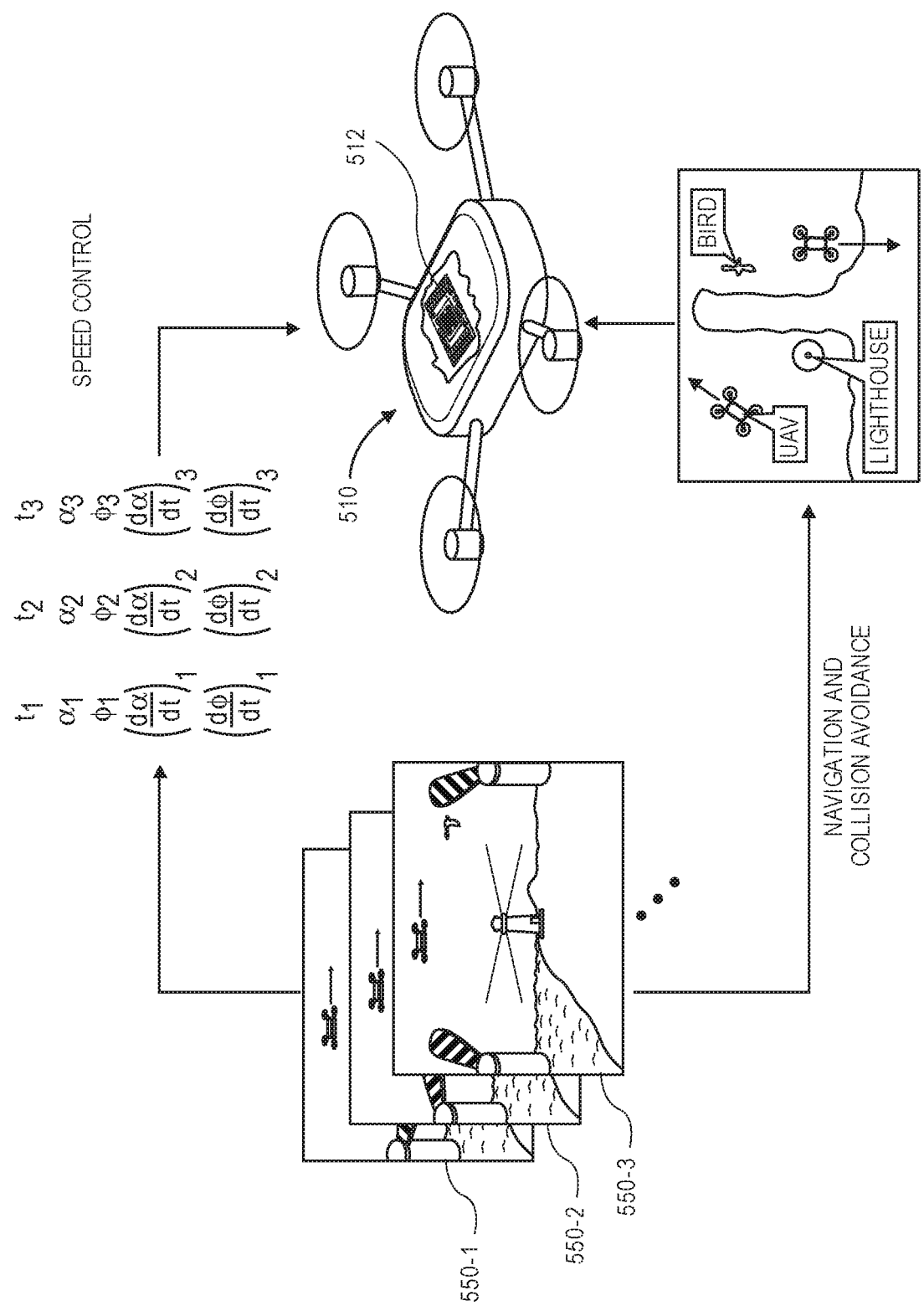

Thus, referring to FIG. 5H, based on a plurality of images captured using the imaging device 540-1, viz., the images 550-1, 550-2, 550-3, and any images subsequently captured, one or more processors 512 aboard the aerial vehicle 510 may not only determine positions or angles $\phi_1$, $\alpha_1$, $\phi_2$, $\alpha_2$, $\phi_3$, $\alpha_3$ of the propellers 535-1, 535-3 and rotational speeds and directions $(d\phi/dt)_1$, $(d\alpha/dt)_1$, $(d\phi/dt)_2$, $(d\alpha/dt)_2$, $(d\phi/dt)_3$, $(d\alpha/dt)_3$ of the propellers 535-1, 535-3, but also for any other applications, purposes or functions, such as navigation or collision avoidance. By processing a plurality of images over time, the processor 512 may determine any errors or inconsistencies in a position, an angle, a rotational speed or a direction of rotation determined from any given image, or may calculate an average, smoothed rotational speed or direction over time, and more readily determine when such positions, angles, rotational speeds or directions have changed.

Although FIGS. 5A through 5H refer only to images 550-1, 550-2, 550-3 captured using the imaging device 540-1, and including the propellers 535-1, 535-3 and the motors 530-1, 530-3 within the field of view 545-1, those of ordinary skill in the pertinent arts will recognize that the systems and methods of the present disclosure may capture and process images using the imaging device 540-2, and including the propellers 535-2, 535-4 and the motors 530-2, 530-4 within the field of view 545-2 in a similar manner, e.g., to determine rotational speeds and directions of the propellers 535-2, 535-4, and also for any other applications, purposes or functions, such as navigation or collision avoidance. Alternatively, any images captured using any other imaging devices aboard the aerial vehicle 510 (not shown) that depict one or more of the propellers 535-1, 535-2, 535-3, 535-4 or the motors 530-1, 530-2, 530-3, 530-4 may also be processed and used in a similar manner.

Figure 6:
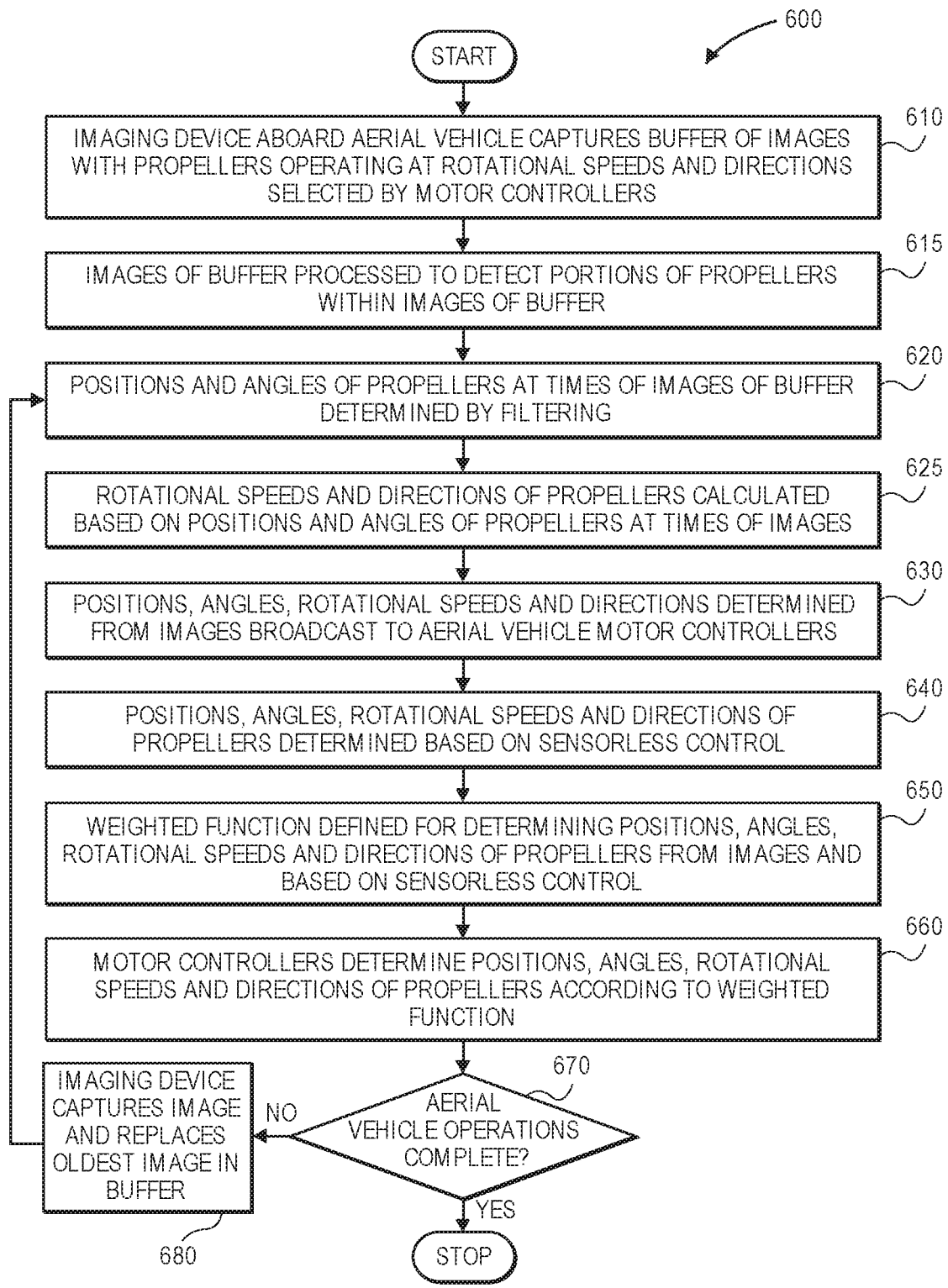
FIG. 6 is a flow chart of one process for determining or controlling propeller speeds in accordance with embodiments of the present disclosure.

Referring to FIG. 6, a flow chart 600 of one process for determining or controlling propeller speeds using imaging devices in accordance with embodiments of the present disclosure is shown. At box 610, an imaging device provided aboard an aerial vehicle captures a buffer of images with propellers operating at rotational speeds and directions selected by motor controllers. For example, referring again to FIG. 5H, the images 550-1, 550-2, 550-3, and any other images subsequently or previously captured by the imaging device 540-1, may be captured during the operation of the propellers 535-1, 535-3 and the motors 530-1, 530-3 in response to one or more control signals. At box 615, the images of the buffer are processed to detect portions of the propellers therein, e.g., by one or more computer-vision or machine learning techniques. In some embodiments, the propellers may include one or more lines, shapes, patterns, colors, textures, alphanumeric characters, symbols or any other markings in order to enhance a probability or likelihood that aspects of the propellers may be detected within such images.

At box 620, positions and angles of the propellers at times of the respective images of the buffer are determined by filtering or other processes (e.g., image segmentation). For example, portions of the propellers that are detected within the images of the buffer at box 615 may be compared to known properties of propellers to determine their respective angles of orientation about a rotational axis, which may be defined by hubs of the propellers, shafts of the motors, or any other components. The times may be determined based on a frame rate of the imaging device, based on time-stamps associated with one or more of the images, or in any manner.

At box 625, rotational speeds and directions of the propellers are calculated based on the positions and angles of the propellers at the times of the respective images, as determined at box 620. The speeds may be measured and represented according to any rotational velocity metric or standard, such as rotational position per unit time, such as revolutions per minute, angles (e.g., in degrees or radians) per second, or any other metric or standard.

At box 630, the positions, angles, rotational speeds and directions determined from the images are broadcast to the aerial vehicle motor controllers, e.g., over a communications network or bus, such as via one or more wired or wireless connections between one or more processors and one or more control systems. At box 640, positions, angles, rotational speeds and directions of the propellers are determined by sensorless techniques, e.g., based on electrical inputs such as currents and/or voltages supplied to one or more motors or motor controllers. Alternatively, the positions, angles, rotational speeds and directions may be determined from one or more hardware components, such as encoders.

At box 650, a weighted function is defined for determining the positions, the angles, the rotational speeds and the directions of the propellers from the images of the buffer captured at box 610 and also based on sensorless techniques. For example, as is discussed above, positions, angles, rotational speeds and/or directions of the propellers determined from sensorless techniques are less accurate when the propellers are operating at low speeds, e.g., at speeds below fifty to one hundred revolutions per minute (50-100 rpm), or when the propellers are reversing their directions of rotation. Positions, angles, rotational speeds and/or directions of the propellers determined based on the images of the buffer are less accurate when the propellers are operating at high speeds.

Therefore, a weighted function that considers the properties or characteristics of image-based position, angle, rotational speed and direction determination, and the properties or characteristics of positions, angles, rotational speeds and directions determined by sensorless techniques, may be defined. The weighted function may determine one or more control signals for operating a propulsion motor comprising a first ratio or fraction and a rotational speed determined from images, and a product of a second ratio or fraction and a rotational speed determined from sensorless techniques, e.g., based on electrical inputs such as currents and/or voltages supplied to one or more motors or motor controllers. For example, at low speeds, the weighted function may more strongly favor positions, angles, rotational speeds and directions determined from images, as opposed to positions, angles, rotational speeds and directions determined by sensorless techniques, or may consider positions, angles, rotational speeds and directions determined from such images to the exclusion of positions, angles, rotational speeds and directions determined by sensorless techniques. Conversely, at high speeds, the weighted function may more strongly favor positions, angles, rotational speeds and directions determined by sensorless techniques, as opposed to positions, angles, rotational speeds and directions determined from images, or may consider positions, angles, rotational speeds and directions determined by sensorless techniques to the exclusion of positions, angles, rotational speeds and directions determined from images.

After the weighted function has been defined, the process advances to box 660, where the motor controller determines positions, angles, rotational speeds and directions of the propellers according to the weighted function. The positions, the angles, the rotational speeds and the directions of the propellers may be utilized for any purpose, such as to generate and transmit one or more control signals or instructions to the respective propulsion motors for causing the propellers to be aligned in selected positions, at selected angles, or to be rotated at selected rotational speeds and in selected directions.

At box 670, whether the aerial vehicle operations are complete is determined. If the aerial vehicle operations are complete, then the process ends. If the aerial vehicle operations are not complete, then the process advances to box 680, where the imaging device captures an image and replaces the oldest image in the buffer with the captured image before returning to box 620, where positions and angles of the propellers at times of the respective images of the buffer are determined by filtering or other processes.

As is discussed above, propellers appearing within fields of view of imaging devices provided aboard aerial vehicles may have one or more markings on external surfaces thereof. Such markings may be selected in order to increase a likelihood that a position and/or angular orientation of the propeller may be detected within imaging data captured using the imaging devices. Referring to FIGS. 7A through 7F, views of propellers in accordance with embodiments of the present disclosure are shown. Except where otherwise noted, reference numerals preceded by the number "7"

shown in FIGS. 7A through 7F indicate components or features that are similar to components or features having reference numerals preceded by the number "5" shown in FIGS. 5A through 5H, by the number "4" shown in FIGS. 4A through 4D, by the number "2" shown in FIG. 2 or by the number "1" shown in FIGS. 1A through 1F.

Figure 7A:
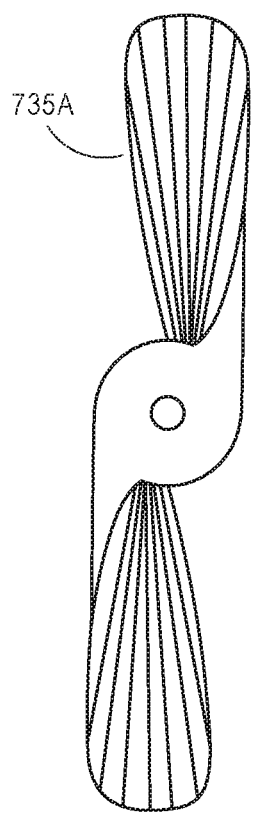

For example, a propeller may be marked by one or more lines, stripes or other markings, e.g., by paint, adhesive decals, molding, or other features. Referring to FIG. 7A, a propeller 735A of the present disclosure is shown. The propeller 735A includes stripes extending in radial directions outward from a hub of the propeller 735A on faces of blades of the propeller 735A, thereby enhancing the appearance of the propeller 735A within imaging data. The stripes shown in FIG. 7A may also be of any color, shape or thickness, and may be selected to contrast with background colors of the propeller 735A. For example, in some embodiments, the stripes may be black and the propeller 735A may be white, or vice versa. In some other embodiments, the stripes and the propeller 735A may be shown in complementary colors, e.g., orange and blue, red and green, or purple and yellow, or in any other pairs of contrasting colors. For example, the colors of the stripes may be selected according to a chroma key technique, e.g., to correspond with a selected video channel of an imaging device. In still other embodiments, the stripes may be formed from or coated with reflective materials, thereby further enhancing the appearance of the propeller 735A within imaging data, including not only color or grayscale imaging data but also depth imaging data. Additionally, the radial alignment of the stripes on the propeller 735A further simplifies processes for determining angular alignments or positions of the propeller 735A within imaging data, as such stripes are aligned in radially with respect to the hub.

Figure 7B:
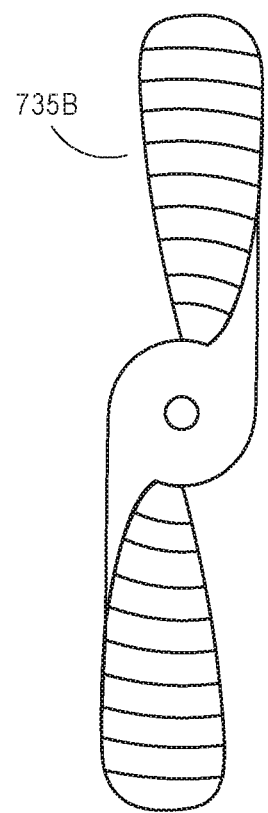

Referring to FIG. 7B, a propeller 735B of the present disclosure is shown. The propeller 735B includes stripes that are aligned circumferentially with respect to a hub of the propeller 735B on faces of blades of the propeller 735B, thereby enhancing the appearance of the propeller 735B within imaging data. The stripes shown in FIG. 7B may also be of any color, shape or thickness, and may be selected to contrast with background colors of the propeller 735B. Additionally, the circumferential alignment of the stripes on the propeller 735B further simplifies processes for determining angular alignments or positions of the propeller 735B within imaging data, for such stripes are aligned perpendicular to the angular alignments of the propeller 735B.

Figure 7C:
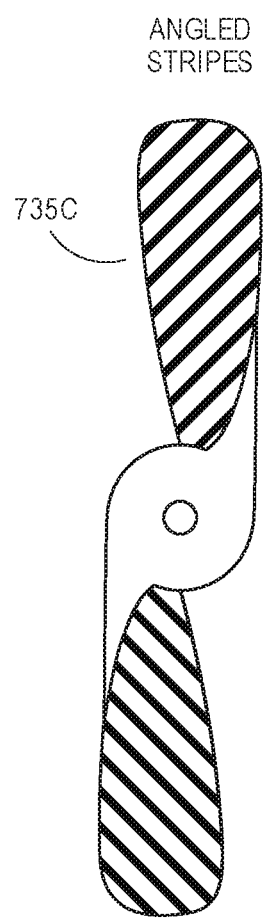

Referring to FIG. 7C, a propeller 735C of the present disclosure is shown. The propeller 735C includes stripes aligned at approximately forty-five degrees with respect to radii extending from a hub of the propeller 735C on faces of blades of the propeller 735C, thereby enhancing the appearance of the propeller 735C within imaging data. The stripes shown in FIG. 7C may also be of any color, shape or thickness, and may be selected to contrast with background colors of the propeller 735C.

Figure 7D:
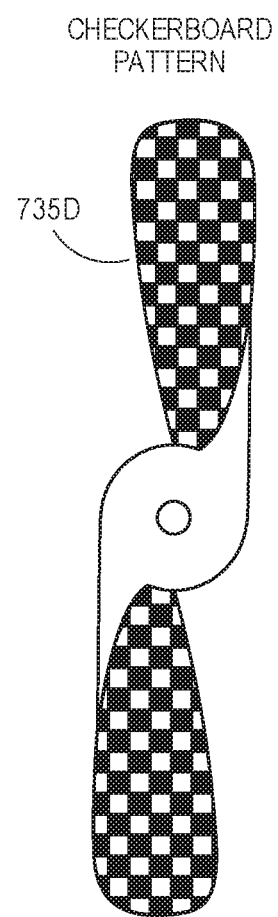

A propeller may also be marked by one or more patterns in accordance with some embodiments of the present disclosure. Referring to FIG. 7D, a propeller 735D of the present disclosure is shown. The propeller 735D is shown with a checkerboard pattern on faces of blades of the propeller 735D, thereby enhancing the appearance of the propeller 735D within imaging data. The squares of the checkerboard pattern shown in FIG. 7D may be of any color, size or thickness, and may be selected to contrast with one another on the propeller 735D. Additionally, the fixed sizes and alignments of the squares may further simplify processes for determining angular alignments or positions of the propeller 735D within imaging data.

Figures 7D, 7F:
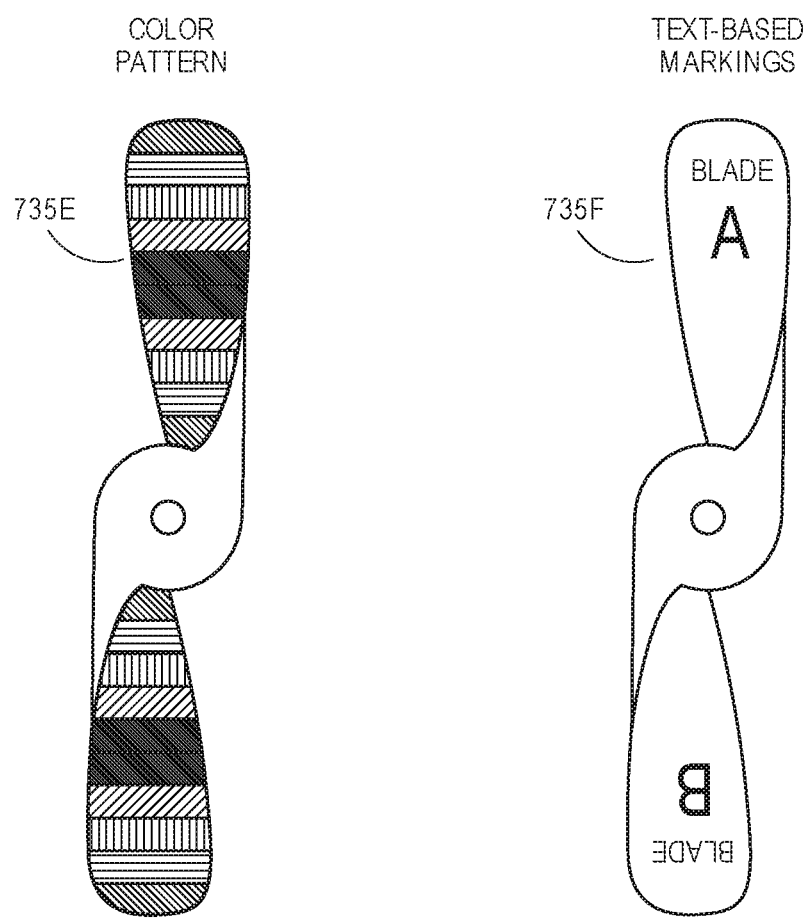

Additionally, a propeller may be marked with one or more colors. Referring to FIG. 7E, a propeller 735E of the present disclosure is shown. The propeller 735E has patterns of colors extending radially outward from a hub of the propeller 735E. The patterns may include any colors, and any number of colors, in bands, stripes or lines of any thickness or weight on blades of the propeller 735E. A propeller may also be marked with one or more alphanumeric characters or symbols. Referring to FIG. 7F, a propeller 735F of the present disclosure is shown. The blades of the propeller 735F are marked with characters identifying the specific blades of the propeller 735F, thereby further enhancing their visibility within imaging data, and enabling a specific blade of the propeller 735F to be more readily identified within the imaging data.

Although some of the embodiments disclosed herein reference the use of unmanned aerial vehicles, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3A and 3B or 6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
    a frame;
    a plurality of propulsion motors mounted to the frame, wherein each of the propulsion motors is configured to rotate a propeller about an axis;
    a digital camera mounted to the frame, wherein the digital camera includes at least a first propeller of a first propulsion motor within a field of view; and
    at least one computer processor in communication with each of the propulsion motors and the digital camera, wherein the at least one computer processor is configured to at least:
        capture a first image by the digital camera at a first time;
        capture a second image by the digital camera at a second time;
        detect at least a first blade of the first propeller within the first image;
        detect at least the first blade of the first propeller within the second image;
        determine a first angle of the first blade of the first propeller at the first time based at least in part on the first image;
        determine a second angle of the first blade of the first propeller at the second time based at least in part on the second image; and
        determine a rotational speed of the first propeller at the second time based at least in part on the first angle and the second angle.

2. The unmanned aerial vehicle of claim 1, wherein the first blade comprises at least one of a stripe, a pattern or an alphanumeric character on at least one face, and
    wherein the at least one computer processor is further configured to at least:
        detect the at least one of the stripe, the pattern or the alphanumeric character on the at least one face in the first image, and
        detect the at least one of the stripe, the pattern or the alphanumeric character on the at least one face in the second image.

3. The unmanned aerial vehicle of claim 1, wherein the at least one computer processor is further configured to at least:
    select at least one of a course, a speed or an altitude of the aerial vehicle based at least in part on at least one of the first image or the second image.

4. A method comprising:
    capturing a first image by a first imaging device provided aboard an aerial vehicle at a first time, wherein a first field of view of the first imaging device includes at least a portion of a first propeller coupled to a first propulsion motor;
    capturing a second image by the first imaging device at a second time;
    determining a first angle of a first blade of the first propeller based at least in part on the first image;
    determining a second angle of the first blade of the first propeller based at least in part on the second image;
    determining a difference between the second angle and the first angle;
    determine an elapsed time between the second time and the first time; and
    determining a first rotational speed of the first propeller at the second time,
        wherein the first rotational speed of the first propeller at the second time is determined based at least in part on the difference between the second angle and the first angle and the elapsed time between the second time and the first time.

5. The method of claim 4, wherein the first field of view further includes at least a portion of a second propeller coupled to a second propulsion motor, and
    wherein the method further comprises:
        determining a third angle of a second blade of the second propeller based at least in part on the first image;
        determining a fourth angle of the second blade of the second propeller based at least in part on the second image;
        determining a difference between the fourth angle and the third angle; and
        determining a second rotational speed of the second propeller at the second time,
            wherein the second rotational speed of the second propeller at the second time is determined based at least in part on the difference between the fourth angle and the third angle and the elapsed time between the second time and the first time.

6. The method of claim 4, further comprising:
    capturing a third image by a second imaging device provided aboard the aerial vehicle at a third time, wherein a second field of view of the second imaging device includes at least a portion of a second propeller coupled to a second propulsion motor;
    capturing a fourth image by the second imaging device at a fourth time;
    determining a third angle of a second blade of the second propeller based at least in part on the third image;
    determining a fourth angle of the second blade of the second propeller based at least in part on the fourth image;
    determining a difference between the fourth angle and the third angle;
    determining an elapsed time between the fourth time and the third time; and determining a second rotational speed of the second propeller at the fourth time,
  wherein the second rotational speed of the second propeller at the fourth time is determined based at least in part on the difference between the second angle and the first angle and the elapsed time between the second time and the first time.

7. The method of claim 4, wherein determining the first angle of the first blade of the first propeller comprises:
  executing at least one image segmentation algorithm on at least a portion of the first image; and
  determining the first angle of the first blade based at least in part on a first output of the at least one image segmentation algorithm, wherein the first output is a first binarized image, and
  wherein determining the second angle of the first blade of the first propeller comprises:
  executing the at least one image segmentation algorithm on at least a portion of the second image; and
  determining the second angle of the first blade based at least in part on a second output of the at least one image segmentation algorithm, wherein the second output is a second binarized image.

8. The method of claim 4, wherein determining the first angle of the first blade of the first propeller comprises:
  providing at least a portion of the first image as a first input to at least one artificial neural network, wherein the artificial neural network is trained to recognize at least one portion of a propeller within imaging data;
  receiving a first output from the at least one artificial neural network in response to the first input; and
  detecting the first blade of the first propeller within the portion of the first image based at least in part on the first output, and
  wherein determining the second angle of the first blade of the first propeller comprises:
  providing at least a portion of the second image as a second input to the at least one artificial neural network;
  receiving a second output from the at least one artificial neural network in response to the second input; and
  detecting the first blade of the first propeller within the portion of the second image based at least in part on the second output.

9. The method of claim 4, wherein the first blade comprises a marking on a first face of the first blade,
  wherein determining the first angle of the first blade comprises:
  detecting at least the marking in the first image, and
  wherein determining the second angle of the first blade comprises:
  detecting at least the marking in the second image.

10. The method of claim 4, wherein the marking comprises at least one of:
  a stripe;
  a pattern;
  an alphanumeric character; or
  a first color.

11. The method of claim 4, wherein the first rotational speed is not greater than fifty revolutions per minute.

12. The method of claim 4, further comprising:
  capturing a sequence of images at a predetermined frame rate, wherein each of the first image and the second image is one of the images of the sequence, and
  wherein the first rotational speed is determined based at least in part on at least some of the images of the sequence and the frame rate.

13. The method of claim 4, wherein the first imaging device is embedded in at least a first surface of the aerial vehicle, and
  wherein the first field of view extends forward of the aerial vehicle, aft of the aerial vehicle, in a port direction from the aerial vehicle, in a starboard direction from the aerial vehicle, above the aerial vehicle or below the aerial vehicle.

14. The method of claim 4, further comprising:
  determining at least one of a voltage level or a current level supplied to the first propulsion motor at the second time;
  determining a second rotational speed of the first propeller at the second time based at least in part on the voltage level or the current level;
  generating a control signal for the first propulsion motor based at least in part on at least one of the first rotational speed or the second rotational speed; and
  providing the control signal to the first propulsion motor.

15. The method of claim 14, wherein generating the control signal comprises:
  defining a weighted function based at least in part on at least one of the first rotational speed or the second rotational speed, wherein the weighted function comprises a first product of at least a first ratio and the first rotational speed and a second product of at least a second ratio and the second rotational speed.

16. The method of claim 4, wherein the first propulsion motor is a brushless multi-phase direct current motor,
  wherein the first propeller further comprises a hub and a second blade, and
  wherein each of the first blade and the second blade is coupled to the hub.

17. The method of claim 4, further comprising:
  selecting at least one of a course, a speed or an altitude of the aerial vehicle based at least in part on at least one of the first image or the second image.

18. The method of claim 4, further comprising:
  determining a position of at least one of the aerial vehicle, a ground-based object or an airborne object based at least in part on at least one of the first image or the second image.

19. A method comprising:
  capturing a buffer of images by an imaging device aboard an aerial vehicle, wherein each of the images of the buffer is captured at a frame rate, and wherein a field of view of the imaging device includes at least one blade of a rotating propeller;
  executing an algorithm on each of the images of the buffer;
  extracting information regarding an angle of the at least one blade from each of the images of the buffer;
  determining a first rotational speed of the rotating propeller based at least in part on the information regarding the angles of the at least one blade extracted from each of the images of the buffer and the frame rate;
  capturing a first image by the imaging device at a first time;
  updating the buffer of images, wherein updating the buffer of images comprises:
  identifying a second image captured at a second time, wherein the second time precedes the first time;
  removing the second image from the buffer; and
  adding the first image to the buffer;
  executing the algorithm on each of the images of the updated buffer;

extracting information regarding an angle of the at least one blade from each of the images of the updated buffer; and determining a second rotational speed of the rotating propeller based at least in part on the information regarding the angles of the at least one blade extracted from each of the images of the updated buffer and the frame rate.

20. The method of claim 19, wherein at least one face of the at least one blade comprises at least one of:

a stripe;

a pattern;

an alphanumeric character; or a color contrast.

* * * * *